(12) United States Patent
Hua et al.

(10) Patent No.: US 12,307,041 B2
(45) Date of Patent: May 20, 2025

(54) TOUCH PANEL

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Hui Hua, Beijing (CN); Yuju Chen, Beijing (CN); Yingzi Wang, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/246,611

(22) PCT Filed: Apr. 27, 2022

(86) PCT No.: PCT/CN2022/089462
§ 371 (c)(1),
(2) Date: Mar. 24, 2023

(87) PCT Pub. No.: WO2023/206117
PCT Pub. Date: Nov. 2, 2023

(65) Prior Publication Data
US 2024/0302917 A1     Sep. 12, 2024

(51) Int. Cl.
*G06F 3/041* (2006.01)
*G06F 3/01* (2006.01)
*G06F 3/044* (2006.01)

(52) U.S. Cl.
CPC .......... *G06F 3/04164* (2019.05); *G06F 3/016* (2013.01); *G06F 3/04146* (2019.05);
(Continued)

(58) Field of Classification Search
CPC .. G06F 3/04164; G06F 3/016; G06F 3/04146; G06F 3/0445; G06F 3/0446; G06F 3/0448
See application file for complete search history.

(56) References Cited

U.S. PATENT DOCUMENTS

| | | |
|---|---|---|
| 4,731,694 A | 3/1988 | Grabner et al. |
| 2012/0075221 A1 | 3/2012 | Yasuda |

(Continued)

FOREIGN PATENT DOCUMENTS

| | | |
|---|---|---|
| CN | 104461201 A | 3/2015 |
| CN | 105094425 A | 11/2015 |

(Continued)

*Primary Examiner* — Amit Chatly
(74) *Attorney, Agent, or Firm* — LEASON ELLIS LLP

(57) ABSTRACT

A touch panel, the touch panel includes a control substrate, a touch layer and a piezoelectric layer that are stacked; the control substrate includes a first substrate and a control circuit layer arranged on the first substrate, and the touch layer and the piezoelectric layer are located on the control substrate, the control circuit layer comprises a control circuit, and the control circuit is electrically connected with the touch layer and the piezo electric layer respectively, and is configured to apply electrical signals to the touch layer and the piezoelectric layer and/or receive electrical signals from the touch layer and the piezoelectric layer respectively. The touch panel can realize the global tactile feedback function, and has a simple structure and has the advantages of thinner, lighter, lower driving voltage, and lower power consumption.

17 Claims, 18 Drawing Sheets

(52) U.S. Cl.
CPC .......... *G06F 3/0445* (2019.05); *G06F 3/0446* (2019.05); *G06F 3/0448* (2019.05)

(56) References Cited

U.S. PATENT DOCUMENTS

| | | | | |
|---|---|---|---|---|
| 2013/0009893 | A1* | 1/2013 | Okumura | G06F 3/016 345/173 |
| 2014/0317498 | A1* | 10/2014 | Okumura | G06F 3/016 715/702 |
| 2014/0354570 | A1 | 12/2014 | Makinen et al. | |
| 2016/0170538 | A1 | 6/2016 | Wang et al. | |
| 2017/0097704 | A1* | 4/2017 | Ando | G06F 3/0445 |
| 2018/0101268 | A1* | 4/2018 | Li | G06F 3/0412 |
| 2018/0210570 | A1 | 7/2018 | Jiang et al. | |
| 2019/0094968 | A1* | 3/2019 | Wen | G06F 3/04166 |
| 2019/0154533 | A1 | 5/2019 | Lim et al. | |
| 2020/0278748 | A1 | 9/2020 | Tsai et al. | |
| 2021/0242393 | A1 | 8/2021 | Tang et al. | |
| 2021/0325986 | A1* | 10/2021 | Jaw | G06F 3/04142 |
| 2021/0373734 | A1* | 12/2021 | Liu | G06F 3/041 |
| 2022/0100297 | A1 | 3/2022 | Tille et al. | |
| 2022/0223782 | A1 | 7/2022 | Itoga et al. | |
| 2022/0291093 | A1* | 9/2022 | Chou | G01N 35/00871 |

FOREIGN PATENT DOCUMENTS

| | | |
|---|---|---|
| CN | 105765750 A | 7/2016 |
| CN | 205880837 U | 1/2017 |
| CN | 109813468 A | 5/2019 |
| CN | 111796669 A | 10/2020 |
| CN | 112783329 A | 5/2021 |
| CN | 113366411 A | 9/2021 |
| JP | S54116844 A | 9/1979 |
| JP | 2008015587 A | 1/2008 |
| JP | 2012069042 A | 4/2012 |
| JP | 2021060486 A | 4/2021 |
| KR | 20100065816 A | 6/2010 |

* cited by examiner

TOUCH PANEL

CROSS-REFERENCE TO RELATED PATENT APPLICATIONS

This application is a U.S. National Stage Application under 35 U.S.C. § 371 of International Patent Application No. PCT/CN2022/089462, filed Apr. 27, 2022, which is incorporated by reference in its entirety.

TECHNICAL FIELD

At least one embodiment of the present disclosure relates to a touch panel.

BACKGROUND

A touchpad is an input device that can move a cursor by sliding the finger, for example the touchpad is used in the devices such as laptops or keyboards. The touchpad is used to know the movement of the finger through capacitive sensing, in a case that a user's finger touches the touchpad, capacitance of the touched position will change, the touch panel will detect the capacitance change and convert it into coordinates to realize touch operation.

SUMMARY

At least one embodiment of the present disclosure provides a touch panel, the touch panel comprises a control substrate, a touch layer and a piezoelectric layer that are stacked, the control substrate comprises a first substrate and a control circuit layer arranged on the first substrate, and the touch layer and the piezoelectric layer are located on the control substrate, the control circuit layer comprises a control circuit, and the control circuit is electrically connected with the touch layer and the piezoelectric layer respectively, and is configured to apply electrical signals to the touch layer and the piezoelectric layer and/or receive electrical signals from the touch layer and the piezoelectric layer respectively.

For example, the touch panel provided by at least one embodiment of the present disclosure further comprises a second substrate, the touch layer and the piezoelectric layer are arranged on the second substrate, and the second substrate, the touch layer and the piezoelectric layer are arranged as a whole on a side of the control circuit layer away from the first substrate.

For example, the touch panel provided by at least one embodiment of the present disclosure further comprises at least one spacer arranged between the second substrate and the control substrate, to space the second substrate and the control substrate.

For example, in the touch panel provided by at least one embodiment of the present disclosure, the at least one spacer comprises a plurality of spacers, and the plurality of spacers are arranged at intervals on edges of the second substrate and the control substrate.

For example, in the touch panel provided by at least one embodiment of the present disclosure, planar shapes of the second substrate and a plane shape of the control substrate are rectangles, and each of the plurality of spacers is shaped in a straight line and the plurality of spacers are disposed along at least two sides of the rectangle respectively.

For example, in the touch panel provided by at least one embodiment of the present disclosure, the plurality of spacers comprise four spacers, each of the four spacers has a shape of a straight line, and the four spacers are disposed at middle positions of four sides of the rectangle respectively.

For example, in the touch panel provided by at least one embodiment of the present disclosure, the plurality of spacers comprise four spacers, and the rectangle comprises two opposite long sides and two opposite short sides, and each of the four spacers has a shape of a straight line, and the four spacers are arranged along the two long sides of the rectangle, and two spacers are correspondingly arranged on each of the two long sides.

For example, in the touch panel provided by at least one embodiment of the present disclosure, a length of each of the long sides is L, and each of the long sides has a first end point and a second end point, and a distance between the first end point and a central axis of one of the two spacers close to the first end point perpendicular to each of the long sides is from $\frac{1}{4}L$ to $\frac{1}{3}L$, and a distance between the second end point and a central axis of one of the two spacers close to the second end point perpendicular to each of the long sides is from $\frac{1}{4}L$ to $\frac{1}{3}L$.

For example, in the touch panel provided by at least one embodiment of the present disclosure, a length of the long side of the rectangle is L, and a length of the short side is W, a length of each spacer in the plurality of spacers is from $0.1\,L$ to $0.5\,L$, and a width of each spacer in the plurality of spacers is from $0.01\,W$ to $0.10\,W$.

For example, in the touch panel provided by at least one embodiment of the present disclosure, planar shapes of the second substrate and the control substrate are rectangles, and the plurality of spacers comprise four spacers, and each of the four spacers is shaped in an L shape and are disposed along four corners of the rectangle.

For example, in the touch panel provided by at least one embodiment of the present disclosure, in a direction perpendicular to the second substrate, a height of the at least one spacer is from $0.5\,mm$ to $10\,mm$.

For example, in the touch panel provided by at least one embodiment of the present disclosure, Young's modulus of material of the at least one spacer is from $0.1\,MPa$ to $2.0\,MPa$.

For example, the touch panel provided by at least one embodiment of the present disclosure further comprises at least one pressure sensor sensitive element arranged between the second substrate and the control substrate, the at least one pressure sensor sensitive element is electrically connected with the control circuit, and in a direction perpendicular to the second substrate, a height of the at least one pressure sensor sensitive element is lower than a height of the at least one spacer.

For example, in the touch panel provided by at least one embodiment of the present disclosure, the at least one pressure sensor sensitive element and the at least one spacer are both arranged on the control substrate, and the at least one pressure sensor sensitive element is separated from the second substrate.

For example, in the touch panel provided by at least one embodiment of the present disclosure, the piezoelectric layer comprises a first control electrode layer, a second control electrode layer, and a piezoelectric material layer between the first control electrode layer and the second control electrode layer, the first control electrode layer comprises a plurality of first pressure sensing electrodes arranged at intervals, at least one of the plurality of first pressure sensing electrodes is configured to transmit a pressure sensing signal to the control circuit in a case that the piezoelectric material layer is under pressure.

For example, in the touch panel provided by at least one embodiment of the present disclosure, the first control electrode layer further comprises a plurality of first vibration feedback electrodes arranged at intervals, the control circuit is configured to apply an electrical signal to at least one of the plurality of first vibratory feedback electrodes in a case that the pressure sensing signal is greater than a threshold, to drive the piezoelectric material layer to vibrate.

For example, in the touch panel provided by at least one embodiment of the present disclosure, the plurality of first pressure sensing electrodes and the plurality of first vibration feedback electrodes are strip-shaped electrodes, and the strip-shaped electrodes extend along a first direction and are arranged at intervals in a second direction which is perpendicular to the first direction.

For example, in the touch panel provided by at least one embodiment of the present disclosure, the plurality of first pressure sensing electrodes and the plurality of first vibration feedback electrodes are arranged alternately in the second direction.

For example, in the touch panel provided by at least one embodiment of the present disclosure, each of the plurality of first pressure sensing electrodes comprises a plurality of sub-strip electrodes spaced along the first direction; and each of the plurality of first vibration feedback electrodes comprises a plurality of sub-strip electrodes spaced along the first direction.

For example, in the touch panel provided by at least one embodiment of the present disclosure, the plurality of first pressure sensing electrodes and the plurality of first vibration feedback electrodes are block-shaped electrodes, the plurality of first pressure sensing electrodes are spaced along the first direction and are arranged in a column, the plurality of first vibration feedback electrodes are spaced along the first direction and are arranged in a column, and a plurality of columns of first pressure sensing electrodes and a plurality of columns of first vibration feedback electrodes are arranged alternately along a second direction perpendicular to the first direction.

For example, in the touch panel provided by at least one embodiment of the present disclosure, a width of each of the plurality of first vibration feedback electrodes in the second direction is greater than a width of each of the plurality of first pressure sensing electrodes in the second direction.

For example, in the touch panel provided by at least one embodiment of the present disclosure, the piezoelectric material layer is arranged on an entire surface.

For example, in the touch panel provided by at least one embodiment of the present disclosure, the piezoelectric material layer comprises a plurality of piezoelectric material patterns, the plurality of piezoelectric material patterns extend along the first direction, and are arranged at intervals in the second direction, orthographic projections of the plurality of piezoelectric material patterns on the second substrate are at least partially overlapped with orthographic projections of the plurality of first pressure sensing electrodes and the plurality of first vibration feedback electrodes on the second substrate.

For example, in the touch panel provided by at least one embodiment of the present disclosure, the second control electrode layer is a surface electrode layer; or the second control electrode layer comprises a plurality of second control electrodes, orthographic projections of the plurality of second control electrodes on the second substrate are at least partially overlapped with orthographic projections of the plurality of first pressure sensing electrodes and orthographic projections of the plurality of first vibration feedback electrodes respectively on the second substrate.

For example, in the touch panel provided by at least one embodiment of the present disclosure, a material of the piezoelectric material layer is one or more of PZT, AlN and KNN.

For example, in the touch panel provided by at least one embodiment of the present disclosure, the touch layer comprises a first touch electrode layer, a second touch electrode layer, and an interval insulating layer between the first touch electrode layer and the second touch electrode layer, the first touch electrode layer comprises a plurality of first touch electrodes extending along a first direction, and the second touch electrode layer comprises a plurality of second touch electrodes extending along a second direction intersecting the first direction.

For example, in the touch panel provided by at least one embodiment of the present disclosure, the touch layer and the piezoelectric layer are respectively arranged on two opposite sides of the second substrate.

For example, in the touch panel provided by at least one embodiment of the present disclosure, the touch layer and the piezoelectric layer are respectively arranged on a same side of the second substrate, and the touch panel further comprises an electromagnetic shielding layer arranged between the touch layer and the piezoelectric layer.

For example, in the touch panel provided by at least one embodiment of the present disclosure, the touch layer is arranged on a side of the piezoelectric layer away from the control substrate, the touch panel further comprises a cover plate on a surface of the touch layer away from the control substrate, and a surface of the cover plate away from the control substrate becomes a touch surface of the touch panel.

BRIEF DESCRIPTION OF THE DRAWINGS

In order to clearly illustrate the technical solution of the embodiments of the present disclosure, the drawings of the embodiments will be briefly described. It is obvious that the described drawings in the following are only related to some embodiments of the present disclosure and thus are not construed as any limitation to the present disclosure.

DETAILED DESCRIPTION

Figure 1:
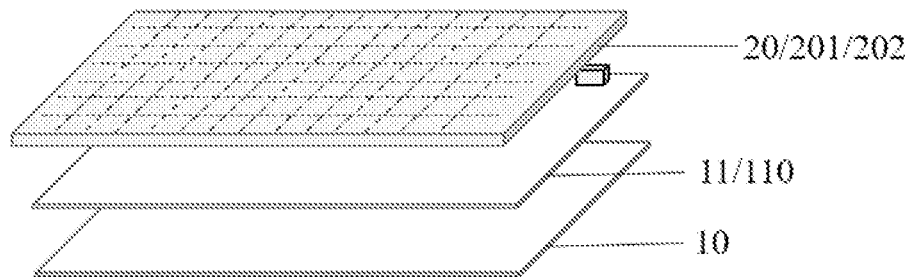
FIG. 1 is a schematic structural diagram of a touch panel provided by at least one embodiment of the present disclosure.

In order to make objects, technical details and advantages of the embodiments of the present disclosure apparent, the technical solutions of the embodiments of the present disclosure will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

In existing touch panels, a global touch panel uses a linear motor and a piezoelectric sheet to provide a sense of vibration and perform operations such as pressing key confirmation. However, both the linear motor and the piezoelectric sheet have disadvantages such as large volume, many components, complex modules, simple touch, and high driving voltage. For example, the linear motor generally includes structures such as a sensor, an actuator, a gasket, and a controller; the piezoelectric sheet usually includes structures such as a circuit board, a conductive cloth, a piezoelectric sheet, a multi-layer adhesive, and a metal plate; an overall thickness and an overall volume of these structures are large, and a lot of parts and components are provided, and matching structures are complicated, which are not conducive to an overall thin design of the touch panel.

At least one embodiment of the present disclosure provides a touch panel, the touch panel includes a control substrate, a touch layer, and a piezoelectric layer which are stacked; the control substrate includes a first substrate and a control circuit layer arranged on the first substrate, the touch layer and the piezoelectric layer are arranged on the control substrate, the control circuit layer includes a control circuit, and the control circuit is electrically connected with the touch layer and the piezoelectric layer respectively, and is configured to apply electrical signals to the touch layer and the piezoelectric layer and/or receive electrical signals from the touch layer and the piezoelectric layer respectively.

The touch panel provided by the embodiments of the present disclosure can realize global tactile feedback, that is, in the whole touch panel, the piezoelectric layer may sense a pressure applied on a surface of the touch panel, and convert the pressure into an electrical signal to provide it to the control circuit, then the control circuit may judge whether the pressure can realize a control operation according to the electric signal, for example, in a case that the electrical signal is greater than a threshold signal, the pressure is judged as the pressure which is exerted to achieve the control operation, at this time, the control circuit may control the piezoelectric layer to further provide vibration, so that richer pressure feeling and touch feeling are realized. On the other hand, the module structure of the touch panel is simple, and has the advantages of thinner, lighter, lower driving voltage, and lower power consumption.

In the following, the touch panel provided by the embodiments of the present disclosure will be described in detail through several specific embodiments.

Figure 2:
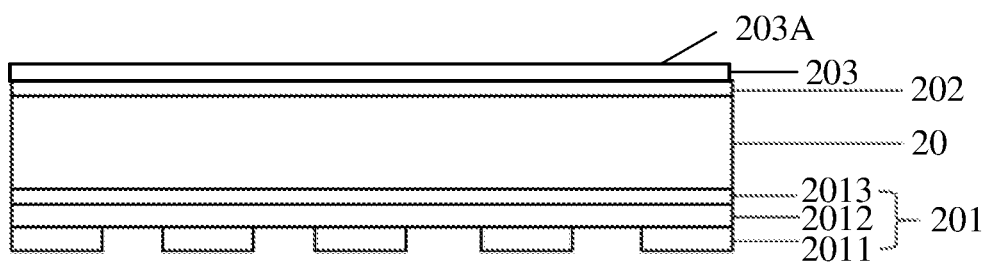
FIG. 2 is a cross-sectional schematic diagram of a touch layer and a piezoelectric layer in a touch panel provided by at least one embodiment of the present disclosure.

At least one embodiment of the present disclosure provides a touch panel, FIG. 1 is a schematic structural diagram of a touch panel provided by at least one embodiment of the present disclosure, and FIG. 2 is a cross-sectional schematic diagram of a touch layer and a piezoelectric layer in a touch panel provided by at least one embodiment of the present disclosure. As shown in FIG. 1, the touch panel includes a control substrate, a touch layer 202 and a piezoelectric layer 201 which are stacked. The control substrate includes a first substrate 10 and a control circuit layer 11 arranged on the first substrate 10, the touch layer 202 and the piezoelectric layer 201 are arranged on the control substrate.

The control circuit layer 11 includes a control circuit 110, and the control circuit 110 is electrically connected with the touch layer 202 and the piezoelectric layer 201 respectively, and is configured to respectively apply electrical signals to the touch layer 202 and the piezoelectric layer 201 and/or receive electrical signals from the touch layer 202 and the piezoelectric layer 201 respectively. In this way, the control circuit 110 can control the touch layer 202 to realize functions such as detecting touch positions, and can control the piezoelectric layer 201 to realize functions such as pressure detection and vibration feedback.

A module structure of the touch panel provided by the embodiment of the present disclosure is simple, the touch panel does not have complicated alignment and assembly of the back adhesive and the conductive cloth, and has a lighter and thinner structure, for example, an overall thickness of the touch panel can be reduced to within 1 mm, and a driving voltage of the touch panel is low (for example, the driving voltage is less than 24V), and its power consumption is small, thus the touch panel is more energy efficient. On the other hand, the touch panel can realize global tactile feedback, and at the same time the touch panel can realize functions such as touch control and pressure detection, vibration feedback, to improve user experience.

For example, in some embodiments, the control circuit layer 110 may also include structures such as a flexible circuit board (FPC) or an integrated circuit (IC), and the control circuit layer 110 has a plurality of contact pads (such as gold fingers), for electrical connection with the touch layer 202 and the piezoelectric layer 201.

For example, in some embodiments, as shown in FIG. 1 and FIG. 2, the touch panel may further include a second substrate 20, the touch layer 202 and the piezoelectric layer 201 are arranged on the second substrate 20, and the second substrate 20, the touch layer 202 and the piezoelectric layer 201 are arranged as a whole on a side of the control circuit layer 11 away from the first substrate 10.

For example, in some embodiments, as shown in FIG. 2, the touch layer 202 and the piezoelectric layer 201 are respectively arranged on two opposite sides of the second substrate 20, so that the touch layer 202 and the piezoelectric layer 201 are spaced far apart, to avoid electromagnetic interference between the touch layer 202 and the piezoelectric layer 201.

For example, during the manufacturing process, the touch layer 202 and the piezoelectric layer 201 may be respectively formed on two opposite sides of the second substrate 20, in this way, the manufacturing process of the touch panel can be simplified, which avoids undesirable phenomena such as broken glass substrates due to multiple processes performed on a same side of the glass substrate in a case that the second substrate 20 is selected as a glass substrate.

For example, in some embodiments, the touch layer 202 is arranged on a side of the piezoelectric layer 201 away from the first substrate 10. For example, as shown in FIG. 2, the touch panel may also include a cover plate 203 on a surface of the touch layer 202 away from the control substrate, the surface 203A (an upper surface in FIG. 2) of the cover plate 203 away from the control substrate becomes a touch surface of the touch panel. For example, the cover plate 203 may be made of organic insulating materials such as PET or tempered glass, to have higher surface hardness.

Figure 3:
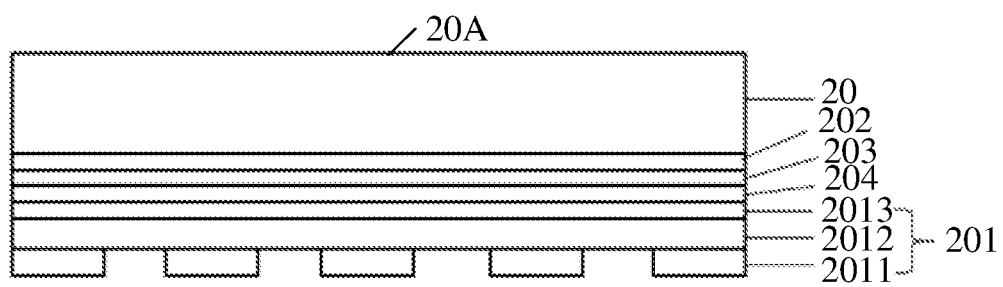
FIG. 3 is a cross-sectional schematic diagram of a touch layer and a piezoelectric layer in another touch panel provided by at least one embodiment of the present disclosure.

For example, FIG. 3 shows another structural schematic diagram of the touch layer and the piezoelectric layer in the touch panel. As shown in FIG. 3, in other embodiments, the touch layer 202 and the piezoelectric layer 201 may also be respectively arranged on a same side of the second substrate 20.

For example, as shown in FIG. 3, the touch panel further includes an electromagnetic shielding layer 203 arranged between the touch layer 202 and the piezoelectric layer 201. Since the touch layer 202 and the piezoelectric layer 201 are arranged on a same side of the second substrate 20, a distance between the touch layer 202 and the piezoelectric layer 201 is relatively short, and electromagnetic interference is likely to occur between the touch layer 202 and the piezoelectric layer 201, by arranging the electromagnetic shielding layer 203 between the touch layer 202 and the piezoelectric layer 201, electromagnetic interference between the touch layer 202 and the piezoelectric layer 201 can be effectively prevented, so that it can be ensured that the touch layer 202 and the piezoelectric layer 201 respectively perform accurate touch sensing operations, pressure sensing, and vibration feedback operations.

For example, in some embodiments, the electromagnetic shielding layer 203 may be arranged on the touch layer 202, that is, arranged on a side of the touch layer 202 close to the piezoelectric layer 201. For example, in some embodiments, the electromagnetic shielding layer 203 may include a metal material, such as a metal layer formed of a metal material such as copper, aluminum, titanium, or a conductive layer formed of a metal oxide material such as indium tin oxide (ITO). For example, the electromagnetic shielding layer 203 may be grounded or be applied with a fixed low-level voltage. For example, a thickness (a dimension in the direction perpendicular to the second substrate 20) of the electromagnetic shielding layer 203 may be from 200 nm to 300 nm, such as 220 nm, 250 nm or 280 nm.

For example, as shown in FIG. 3, the touch panel may further include an interval insulating layer 204 arranged between the electromagnetic shielding layer 203 and the piezoelectric layer 201, which is used to insulate the electromagnetic shielding layer 203 and the piezoelectric layer 201 to prevent signal crosstalk. For example, inorganic insulating materials such as silicon oxide, silicon nitride, or silicon oxynitride may be used for the interval insulating layer 204. For example, a thickness (a dimension in the direction perpendicular to the second substrate 20) of the interval insulating layer 204 may be from 150 nm to 250 nm, such as 180 nm, 200 nm or 230 nm.

For example, in the embodiment shown in FIG. 3, a surface 20A of the second substrate 20 away from the control substrate (an upper surface in FIG. 3) becomes a touch surface of the touch panel; or the touch panel may also include a tempered glass cover plate arranged on a surface 20A of the second substrate 20 away from the control substrate, the tempered glass cover plate has a thinner thickness and stronger hardness, which can improve a user's touch feeling, and can prevent the surface of the touch panel from being broken.

For example, in the embodiment of FIG. 3, the touch layer 202 and the piezoelectric layer 201 are located on a side of the second substrate 20 close to the control substrate, in some other embodiments, the touch layer 202 and the piezoelectric layer 201 may also be located on a side of the second substrate away from the control substrate, and are arranged in sequence along the direction away from the control substrate. For example, in the embodiment of FIG. 2, the touch layer 202 is located on a side of the piezoelectric layer 201 away from the control substrate, in other embodiments, the piezoelectric layer 201 may also be located on a side of the touch layer 202 away from the control substrate.

For example, in some other embodiments, the touch layer 202 and the piezoelectric layer 201 may also be arranged in the same layer, for example arranged side by side on the second substrate 20, for example, the touch layer 202 and the piezoelectric layer 201 respectively include a plurality of regions, a plurality of regions of the touch layer 202 and a plurality of regions of the piezoelectric layer 201 are intersected and (alternately) arranged on the second substrate 20, so that the plurality of regions of the touch layer 202 and the plurality of regions of the piezoelectric layer 201 are arranged in the same layer. Embodiments of the present disclosure do not specifically limit a specific arrangement of the touch layer 202 and the piezoelectric layer 201 and their positions relative to the second substrate 20.

Figure 4:
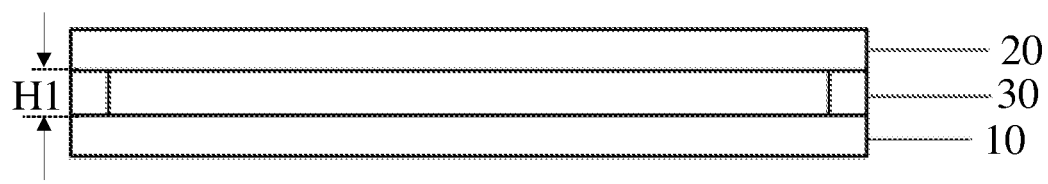
FIG. 4 is a cross-sectional schematic diagram of a touch panel provided by at least one embodiment of the present disclosure.

For example, FIG. 4 shows a cross-sectional schematic diagram of a touch panel provided by at least one embodiment of the present disclosure. In some embodiments, as shown in FIG. 4, the touch panel may further include at least one spacer 30 arranged between the second substrate 20 and the control substrate, to separate the second substrate 20 from the control substrate.

For example, in some embodiments, the at least one spacer 30 may be sandwiched between the second substrate 20 and the touch circuit layer 11, or in some other embodiments, the touch circuit layer 11 is arranged in the middle of the first substrate 10, at this time, the at least one spacer 30 may be interposed between the second substrate 20 and the first substrate 10.

Figure 5A:
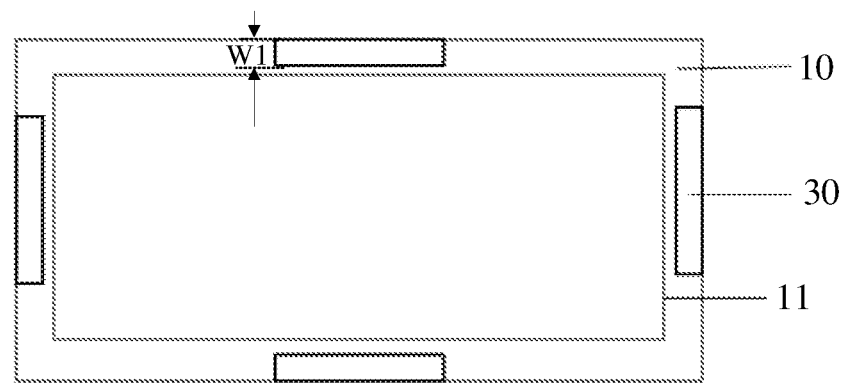
FIG. 5A is a schematic diagram of a planar arrangement of a plurality of spacers in a touch panel provided by at least one embodiment of the present disclosure.
Figure 5B:
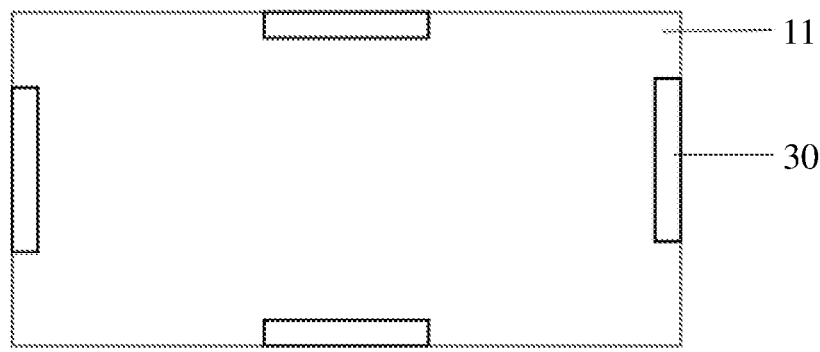
FIG. 5B is a schematic diagram of another planar arrangement of a plurality of spacers in a touch panel provided by at least one embodiment of the present disclosure.

For example, FIG. 5A and FIG. 5B show a schematic diagram of a planar arrangement of spacers 30 in a touch panel. As shown in FIG. 5A and FIG. 5B, the at least one spacer 30 includes a plurality of spacers 30, the plurality of spacers 30 are arranged at intervals on edges of the second substrate 20 and the control substrate.

For example, in some embodiments, plane shapes of the second substrate 20 and the control substrate are rectangular, and the plurality of spacers 30 are arranged in a straight line along at least two sides of the rectangle.

For example, as shown in FIG. 5A and FIG. 5B, in some embodiments, the planar shapes of the second substrate 20 and the control substrate are rectangular, and each of the spacers 30 has a structure of a straight line, and the spacers are arranged along the four sides of the rectangle respectively, for example, the spacers 30 are arranged in the middle of the four sides. For example, in the embodiment shown in FIG. 5A, the touch circuit layer 11 is arranged in the middle of the first substrate 10, that is, edges of the first substrate 10 are exposed, at this time, the plurality of spacers 30 may be directly arranged on the first substrate 10, so that the plurality of spacers 30 may be directly interposed between the second substrate 20 and the first substrate 10. In the embodiment of FIG. 5B, an arrangement range of the touch circuit layer 11 and an arrangement range of the first substrate 10 are basically the same, at this time, the plurality of spacers 30 may be directly arranged on the touch circuit layer 11, so that the plurality of spacers 30 may be directly sandwiched between the touch circuit layer 11 and the first substrate 10.

Figure 6A:
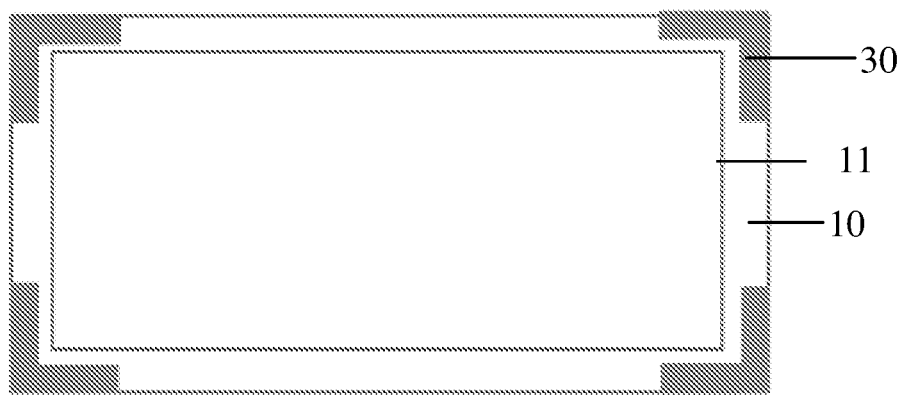
FIG. 6A is a schematic diagram of still another planar arrangement of a plurality of spacers in a touch panel provided by at least one embodiment of the present disclosure.
Figure 6B:
FIG. 6B is a schematic diagram of still another planar arrangement of a plurality of spacers in a touch panel provided by at least one embodiment of the present disclosure.

For example, FIG. 6A and FIG. 6B show another schematic diagram of an arrangement of spacers 30 in a touch panel. As shown in FIG. 6A and FIG. 6B, planar shapes of the second substrate 20 and the control substrate are rectangular, the plurality of spacers 30 include four spacers 30, and the four spacers 30 are L-shaped and arranged along the four corners of the rectangle respectively, in this way, a better supporting effect can thus be provided.

For example, in the embodiment shown in FIG. 6A, the touch circuit layer 11 is arranged in the middle of the first substrate 10, at this time, the four spacers 30 may be directly arranged at the four corners of the first substrate 10, so that the four spacers 30 may be directly sandwiched between the second substrate 20 and the first substrate 10. In the embodiment of FIG. 6B, an arrangement range of the touch circuit layer 11 and the first substrate 10 is basically the same, at this time, the plurality of spacers 30 may be directly arranged at the four corners of the touch circuit layer 11, so that the four spacers 30 may be directly sandwiched between the touch circuit layer 11 and the first substrate 10.

For example, in some embodiments, as shown in FIG. 4, in a direction perpendicular to the second substrate 20, that is, the vertical direction in FIG. 4, a height of each of the spacers 30 may be from 0.5 mm to 10 mm, such as 2 mm, 4 mm, 6 mm or 8 mm. If the heights of the spacers 30 are greater than 10 mm, in a case that an object such as a finger presses the touch panel, the touch panel does not deform seriously and then the structure of the touch panel (such as, the glass substrate) will not be damaged due to excessive pressing force, and in the case that the heights of the spacers 30 are less than 0.5 mm, misoperation with a small pressure will be sensed by the touch panel, resulting in inaccurate sensing by the touch panel.

For example, in some embodiments, as shown in FIG. 5A, in a direction parallel to the second substrate 20, for example, in the vertical direction in FIG. 5A, that is, in a direction perpendicular to the extending direction of the spacers 30, the widths W1 of the spacers 30 may be from 2 mm to 10 mm, such as 3 mm, 5 mm, 7 mm or 9 mm. In this way, the spacers 30 can not only play a function of spacing, but also ensure that the first substrate 10 and the second substrate 20 are in a free vibration state, so that interference with the vibration modes is avoided.

Figure 6C:
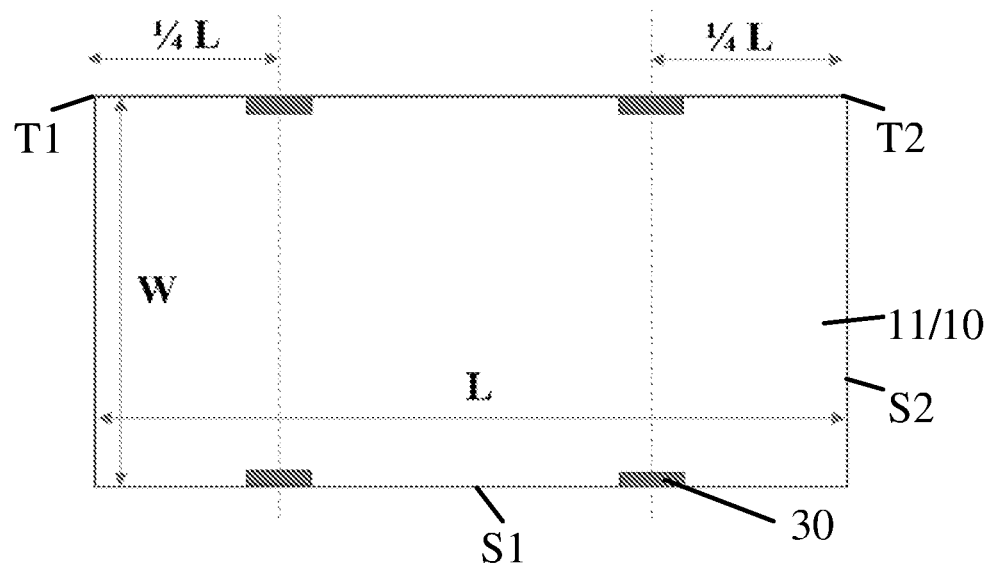
FIG. 6C to FIG. 6G are schematic diagrams of various planar arrangements of a plurality of spacers in a touch panel provided by at least one embodiment of the present disclosure.

For example, in some embodiments, as shown in FIG. 6C, the plurality of spacers 30 include four spacers 30, the rectangle includes two opposite long sides S1 and two opposite short sides S2, each of the four spacers 30 has a structure of a straight line, and the four spacers are arranged along the two long sides S1 of the rectangle respectively, and each of the two long sides S1 is arranged with two spacers 30 correspondingly.

For example, as shown in FIG. 6C, a length of each of the long sides S1 is L, each of the long sides S1 has a first end point T1 and a second end point T2, a distance between the first end point T1 and a central axis of one spacer of the two spacers 30 close to the first end point T1 perpendicular to each of the long sides S1 is from ¼L to ⅓L (¼L is shown in the figure as an example), and a distance between the second end point T2 and a central axis of one spacer of the two spacers 30 close to the second end point T2 perpendicular to each of the long sides S1 is from ¼L to ⅓L (¼L is shown in the figure as example).

For example, as shown in FIG. 6C, the lengths of the long sides S1 of the rectangle are L respectively, the lengths of the short sides S2 of the rectangle are W respectively, the length of each spacer 30 in the plurality of spacers 30 is from 0.1 L to 0.5 L, such as 0.2 L, 0.3 L or 0.4 L, and the width is from 0.01 W to 0.10 W, such as 0.02 W, 0.03 W or 0.05 W. In this way, a better septum effect can be achieved.

Figure 6D:
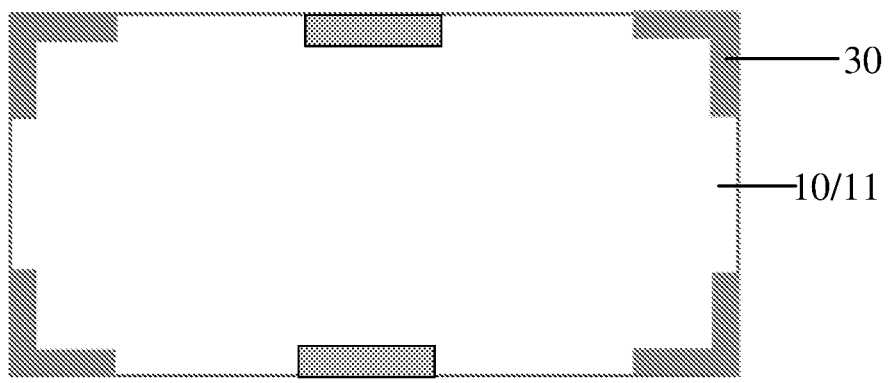
Figure 6E:
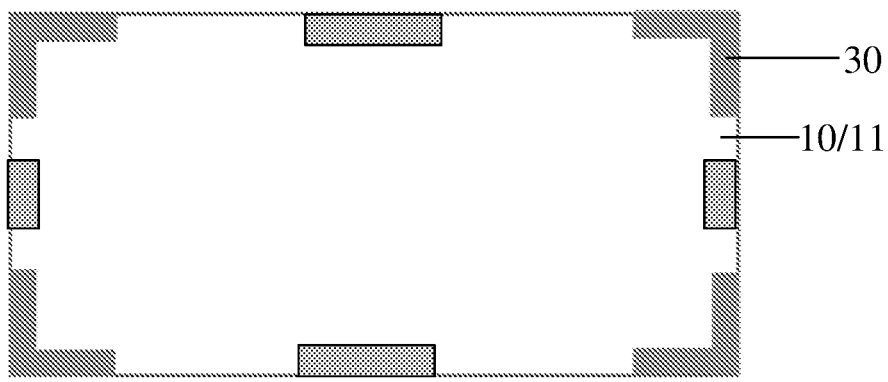
Figure 6F:
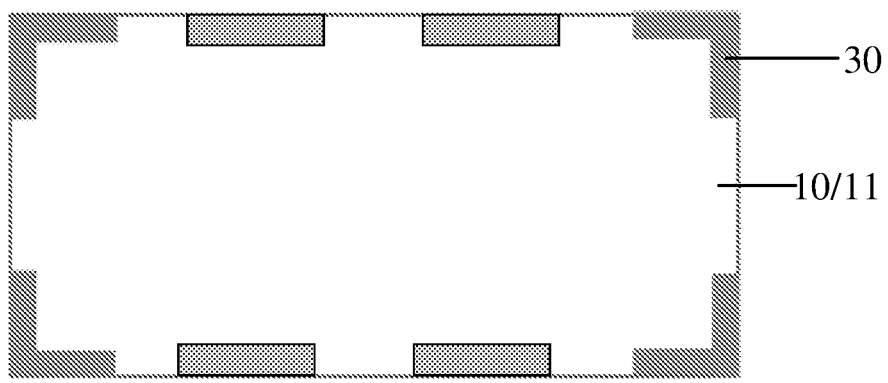
Figure 6G:
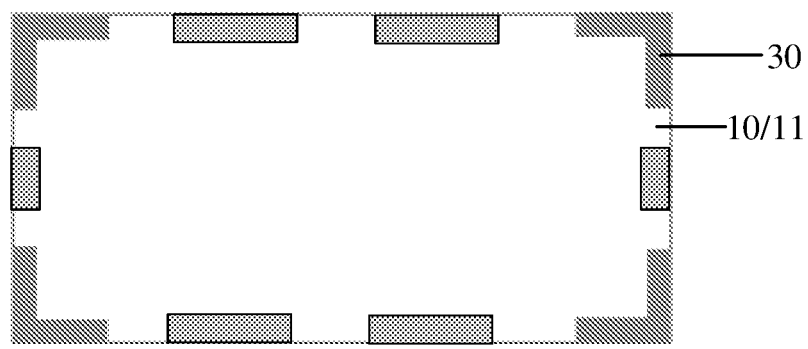

For example, in some embodiments, the number of the spacers 30 may also be more, such as six, eight or ten. For example, in some examples, as shown in FIG. 6D, the number of the spacers 30 may be six, the six spacers 30 are respectively located at the four corners of the rectangle and the middle positions of the two opposite long sides; or in some other embodiments, as shown in FIG. 6E, the number of the spacers may also be eight. The eight spacers 30 are respectively located at the four corners of the rectangle and the middle positions of the two opposite long sides and the middle positions of the two opposite short sides; or in some other embodiments, as shown in FIG. 6F, the number of the spacers may be eight, the eight spacers 30 are respectively located at the four corners of the rectangle and on the two opposite long sides, for example, two spacers are arranged on each of the long sides; or in some other embodiments, as shown in FIG. 6G, the number of the spacers 30 may also be ten, the ten spacers 30 are respectively located at the four corners of the rectangle and on the two opposite long sides and the two opposite short sides; and two spacers are arranged on each of the long sides, and one spacer is arranged on each of the short sides.

The embodiments of the present disclosure do not limit the number of the spacers arranged on each of the long sides and each of the short sides, for example, two spacers may also be arranged on each of the long sides and each of the short sides, or spacers may also be arranged at the four corners at the same time, and two spacers are arranged on each of the long sides and each of the short sides. Whether to arrange spacers on each of the long sides and each of the short sides, and the number of the arranged spacers, whether to arrange spacers on each of the corners, may be arranged according to the lengths of each of the long sides and each of the short sides and specific needs.

For example, in some embodiments, the Young's modulus of the material of the spacers 30 is from 0.1 MPa to 2.0 MPa, such as 0.3 MPa, 0.6 MPa, 1.0 MPa or 1.5 MPa. For example, the material of the spacer 30 may adopt foam, polydimethylsiloxane (PDMS) and other materials with certain elasticity, so that the noise generated by vibration and friction can be reduced in a case that the touch panel vibrates.

Figure 7A:
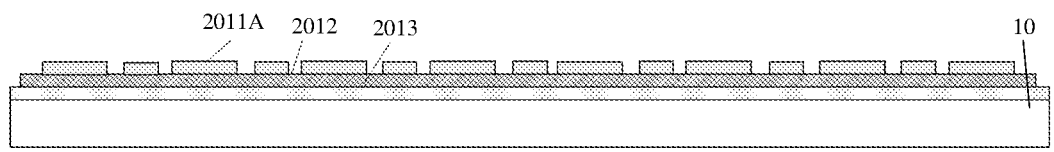
FIG. 7A is a cross-sectional schematic diagram of a piezoelectric layer in a touch panel provided by at least one embodiment of the present disclosure.

For example, FIG. 7A shows a cross-sectional schematic diagram of the piezoelectric layer 201, as shown in FIG. 7A, in some embodiments, the piezoelectric layer 201 includes a first control electrode layer 2011, a second control electrode layer 2013, and a piezoelectric material layer 2012 between the first control electrode layer 2011 and the second control electrode layer 2013.

Figure 7B:
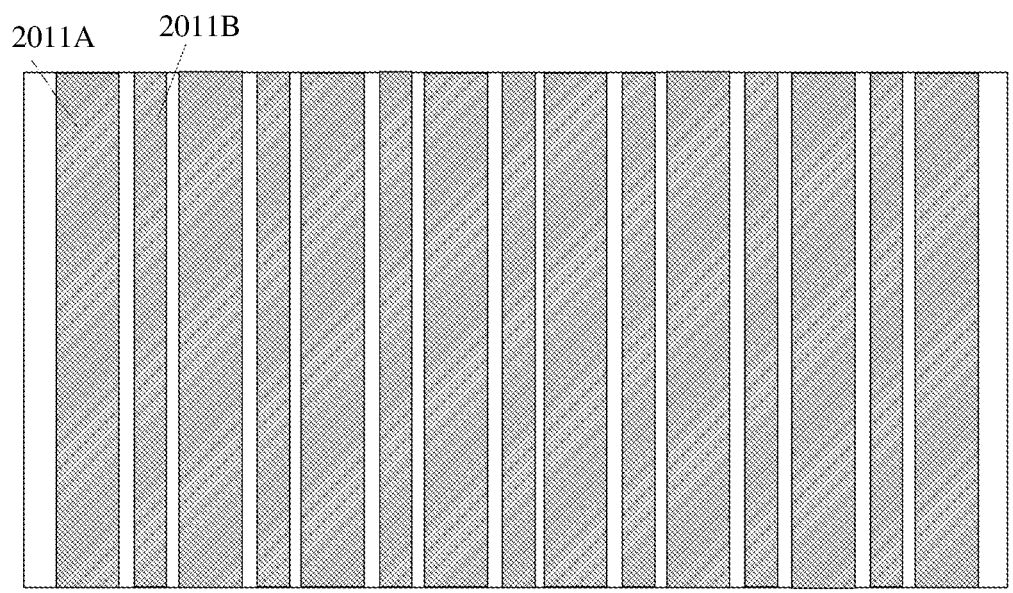
FIG. 7B is a planar schematic diagram of a first control electrode layer of a piezoelectric layer in a touch panel provided by at least one embodiment of the present disclosure.

For example, FIG. 7B shows a planar schematic diagram of the first control electrode layer 2011. As shown in FIG. 7B, the first control electrode layer 2011 includes a plurality of first pressure sensing electrodes 2011B arranged at intervals, at least one of the plurality of first pressure sensing electrodes 2011B is configured to transmit a pressure sensing signal to the control circuit 110 in a case that the piezoelectric material layer 2012 is under pressure.

For example, as shown in FIG. 7B, the first control electrode layer 2011 further includes a plurality of first vibration feedback electrodes 2011A arranged at intervals, the control circuit 110 is configured to apply an electrical signal to at least one of the plurality of first vibration feedback electrodes 2011A in a case that the pressure sensing signal is greater than a threshold, to drive the piezoelectric material layer 2012 to vibrate. In this way, the piezoelectric layer 201 is simultaneously used as a pressure detection layer and a tactile vibration feedback layer, and the touch panel can provide vibration tactile sensation while touching, so as to realize pressing-key confirmation and shortcut operation.

For example, in a case that an object such as a finger touches the touch panel, the resulting pressure deforms the touch panel, and the piezoelectric material layer 2012 generates charges, so that the control circuit detects the "touch behavior", in a case that a charge value/voltage value detected by the control circuit reaches a certain threshold, the control circuit excites the vibration feedback electrode with an electric signal, causing the piezoelectric material layer 2012 to vibrate, in turn, the touch panel is caused to resonate, resulting in large displacement and acceleration, so that a vibration tactile sensation is provided.

For example, a vibration frequency of the piezoelectric material layer 2012 may be controlled within a range of 50 Hz to 600 Hz. Through the test, the human body is more sensitive to the vibration touch in the range of 50 Hz to 1000 Hz, that is, the human body is more likely to perceive the vibration, and is not sensitive to the vibration in the range of 30 Hz to 600 Hz, that is, the human body is not easy to hear the vibration in the range of 30 Hz to 600 Hz, thus the vibration frequency of the piezoelectric material layer 2012 may be controlled within the range of 50 Hz to 600 Hz, in this way, the human body can more easily sense the sense of touch without hearing the vibration.

For example, in some embodiments, as shown in FIG. 7B, the plurality of first pressure sensing electrodes 2011B and the plurality of first vibration feedback electrodes 2011A may be strip electrodes, the strip electrodes extend along a first direction (a vertical direction in FIG. 7B), and are arranged at intervals in a second direction (a horizontal direction in FIG. 7B) perpendicular to the first direction. The plurality of first pressure sensing electrodes 2011B and the plurality of first vibration feedback electrodes 2011A that are arranged above have a relatively large overlapping area with the piezoelectric material layer 2012, thus an effective use area of the piezoelectric material layer 2012 can be increased.

For example, eight columns of first vibration feedback electrodes 2011A and seven columns of first pressure sensing electrodes 2011B are shown in the embodiment of FIG. 7B as an example, but the embodiments of the present disclosure do not limit the number of the first vibration feedback electrodes 2011A and the number of the first pressure sensing electrodes 2011B, which may be selected according to factors such as a size of the touch panel.

For example, as shown in FIG. 7B, the plurality of first pressure sensing electrodes 2011B and the plurality of first vibration feedback electrodes 2011A are arranged alternately in the second direction. For example, one column of first vibration feedback electrodes 2011A is arranged between two adjacent columns of first pressure sensing electrodes 2011B, and one column of first pressure sensing electrodes 2011B is arranged between adjacent first vibration feedback electrodes 2011A.

Figure 8:
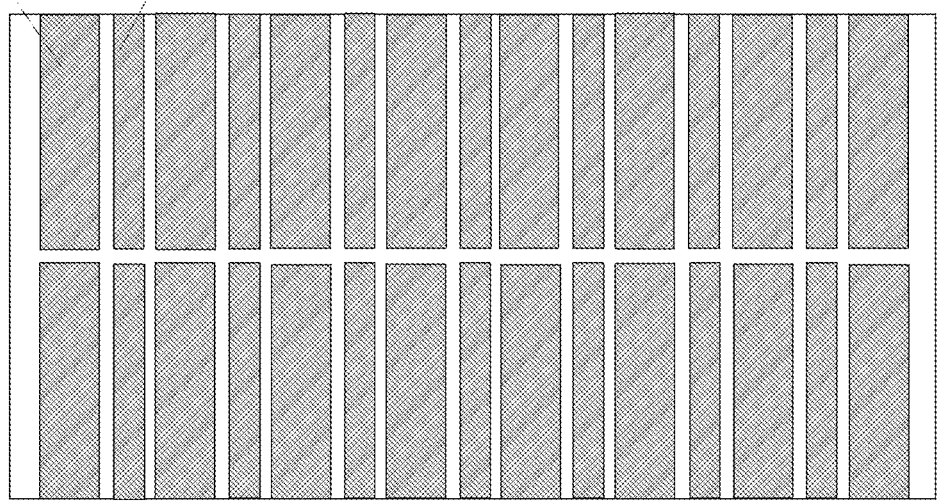
FIG. 8 is another planar schematic diagram of a first control electrode layer of a piezoelectric layer in a touch panel provided by at least one embodiment of the present disclosure.

For example, FIG. 8 shows another planar schematic diagram of the first control electrode layer, as shown in FIG. 8, in other embodiments, each of the plurality of first pressure sensing electrodes 2011B includes a plurality of sub-strip electrodes 2011B1 spaced along the first direction (two sub-strip electrodes 2011B1 are shown in the figure as an example); each of the plurality of first vibration feedback electrodes 2011A includes a plurality of sub-strip electrodes 2011A1 spaced along the first direction (two sub-strip electrodes 2011A1 are shown in the figure as an example). In this way, further separation of the tactile feedback and pressure sensing region can be achieved, so that it is beneficial to partition control and realize more kinds of modal vibrations.

Figure 9:
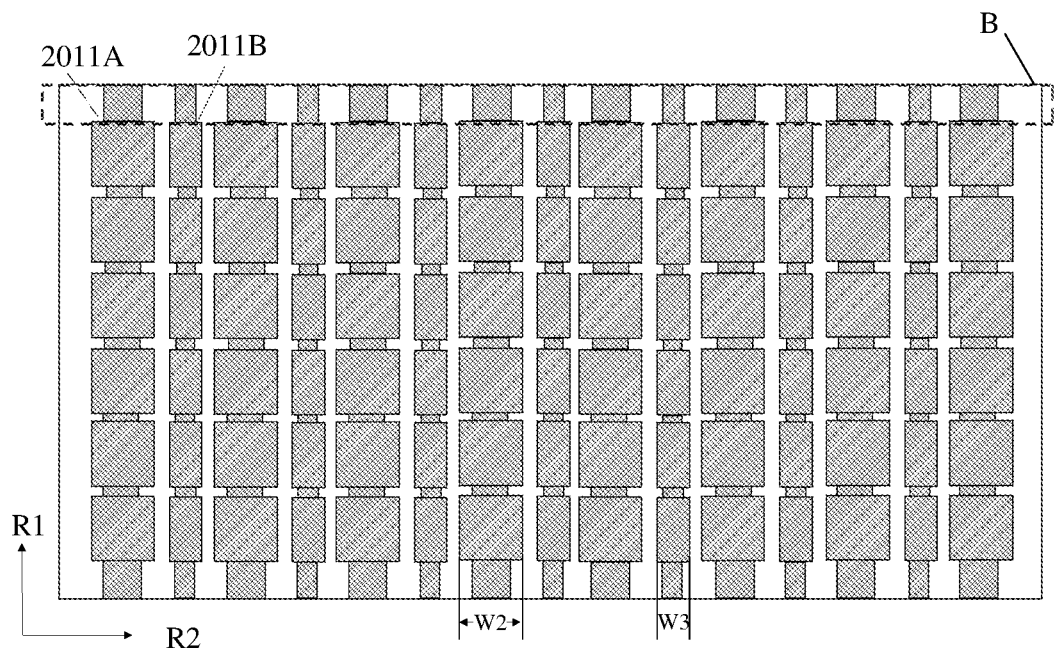
FIG. 9 is still another planar schematic diagram of a first control electrode layer of a piezoelectric layer in a touch panel provided by at least one embodiment of the present disclosure.

For example, FIG. 9 shows another planar schematic diagram of the first control electrode layer, as shown in FIG. 9, in some other embodiments, the plurality of first pressure sensing electrodes 2011B and the plurality of first vibration feedback electrodes 2011A are block electrodes, the plurality of first pressure sensing electrodes 2011B are spaced apart and arranged in a column along the first direction R1 (a vertical direction in FIG. 9), a plurality of first vibration feedback electrodes 2011A are spaced apart and arranged in a column along the first direction R1, and multiple columns of the first pressure sensing electrodes 2011B and multiple columns of the first vibration feedback electrodes 2011A are arranged alternately along a second direction R2 (a horizontal direction in FIG. 9) perpendicular to the first direction R1.

For example, a plurality of first pressure sensing electrodes 2011B in a same column are electrically connected, and are electrically connected with the touch circuit 110 at a bonding region B located at an edge of the piezoelectric layer; a plurality of first vibration feedback electrodes 2011A located in a same column are electrically connected, and are electrically connected with the touch circuit 110 at a bonding region B located at an edge of the piezoelectric layer. Or in some other embodiments, each of the first pressure sensing electrodes 2011B and each of first vibration feedback electrodes 2011A may be electrically connected with the touch circuit 110 respectively; or the plurality of first pressure sensing electrodes 2011B in the same column are electrically connected with the touch circuit 110 in different regions respectively, and the plurality of first vibration feedback electrodes 2011A located in the same column are electrically connected with the touch circuit 110 in different regions respectively.

In this way, the plurality of first pressure sensing electrodes 2011B and the plurality of first vibration feedback electrodes 2011A of the first control electrode layer form a rectangular matrix, and electrical connection structures among the adjacent first pressure sensing electrodes 2011B and the adjacent first vibration feedback electrodes 2011A are relatively narrow, thus in a case that a portion of the pattern of the piezoelectric material layer 2012 (to be introduced later) is short-circuited, the electrodes above the short-circuited part of the piezoelectric material layer 2012 may be cut off by means of cutting off and repairing, so that the portion of the piezoelectric material layer 2012 that is short-circuited no longer participates in the sensing work, in this way, other parts of the piezoelectric material layer 2012 can be guaranteed to continue to work normally.

For example, in some embodiments, as shown in FIG. 7B, FIG. 8 and FIG. 9, a width W2 of each of the plurality of first vibration feedback electrodes 2011A in the second direction R2 is larger than a width W3 of each of the plurality of first pressure sensing electrodes 2011B in the second direction R2. In this way, more adequate vibration feedback operation can be provided, but the pressure sensing is relatively sensitive, even if the area occupied by the first pressure sensing electrodes is small, it will basically not affect the effect of pressure sensing.

For example, in some embodiments, as shown in FIG. 7A, the piezoelectric material layer 2012 may be arranged on the entire surface, that is, the piezoelectric material layer 2012 is arranged continuously as a whole, and is arranged on the second control electrode layer 2013 in a sheet shape.

Figure 10:
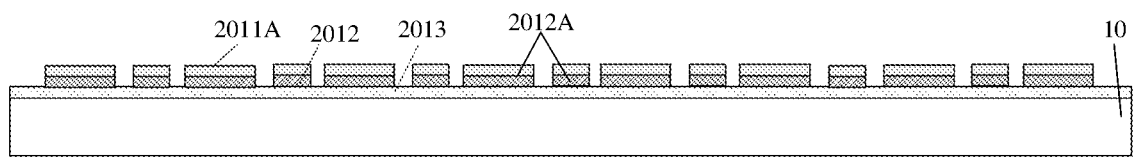
FIG. 10 is another cross-sectional schematic diagram of a piezoelectric layer in a touch panel provided by at least one embodiment of the present disclosure.

Alternatively, in other embodiments, as shown in FIG. 10, the piezoelectric material layer 2012 includes a plurality of piezoelectric material patterns 2012A, the plurality of piezoelectric material patterns 2012A extend along the first direction R1 and are arranged at intervals in the second direction R2, orthographic projections of the plurality of piezoelectric material patterns 2012A on the second substrate 20 are at least partially overlapped with the orthographic projections of the plurality of first pressure sensing electrodes 2021B and the plurality of first vibration feedback electrodes 2021A on the second substrate 20 respectively.

For example, a pattern shape and a size of each of the plurality of piezoelectric material patterns 2012A are basically the same as a pattern shape and a size of each of the plurality of first pressure sensing electrodes 2021B and each of the plurality of first vibration feedback electrodes 2021A, respectively, thus in the manufacturing process, the plurality of piezoelectric material patterns 2012A and the plurality of first pressure sensing electrodes 2021B and the plurality of first vibration feedback electrodes 2021A may be formed in a same patterning process by using a same mask, to simplify the manufacturing process of the touch panel.

In the embodiment of the present disclosure, by patterning the piezoelectric material layer 2012 into a plurality of piezoelectric material patterns 2012A, a binding force of the touch panel can be effectively released, and defects such as warpage at the edges of the touch panel are reduced.

For example, in some embodiments, the material of the piezoelectric material layer 2012 is one or more of PZT (lead zirconate titanate), AlN (aluminum nitride) and KNN [$(K_{0.5}Na_{0.5})NbO_3$]. The above materials all have a piezoelectric effect, which can realize the mutual conversion of mechanical energy and electrical energy. An electrical signal can be generated under pressure or a material can be mechanically deformed under an electric field. Among the various piezoelectric materials mentioned above, PZT has the advantages of high piezoelectric constant and high Curie temperature. AlN and KNN are lead-free piezoelectric materials, which are more green and environmentally friendly. Forming the piezoelectric material layer 2012 by using the above materials can improve the sensitivity of pressure sensing.

For example, in some embodiments, the second control electrode layer 2013 is a surface electrode layer, that is, the second control electrode layer 2013 is arranged continuously as a whole, and is arranged in a sheet shape, for example, on the second substrate 20. For example, in the embodiment of FIG. 7A, the second control electrode layer 2013 is a surface electrode layer, and the piezoelectric material layer 2012 is arranged on the whole surface, and exposes an edge of the second control electrode layer 2013, that is, the piezoelectric material layer 2012 shrinks inward relative to the second control electrode layer 2013, so that the second control electrode layer 2013 is exposed at the edge of the second control electrode layer 2013. In this way, it is helpful for the second control electrode layer 2013 to be electrically connected to the touch circuit 110. In this way, it is helpful for the second control electrode layer 2013 to be electrically connected with the touch circuit 110.

Figure 11A:
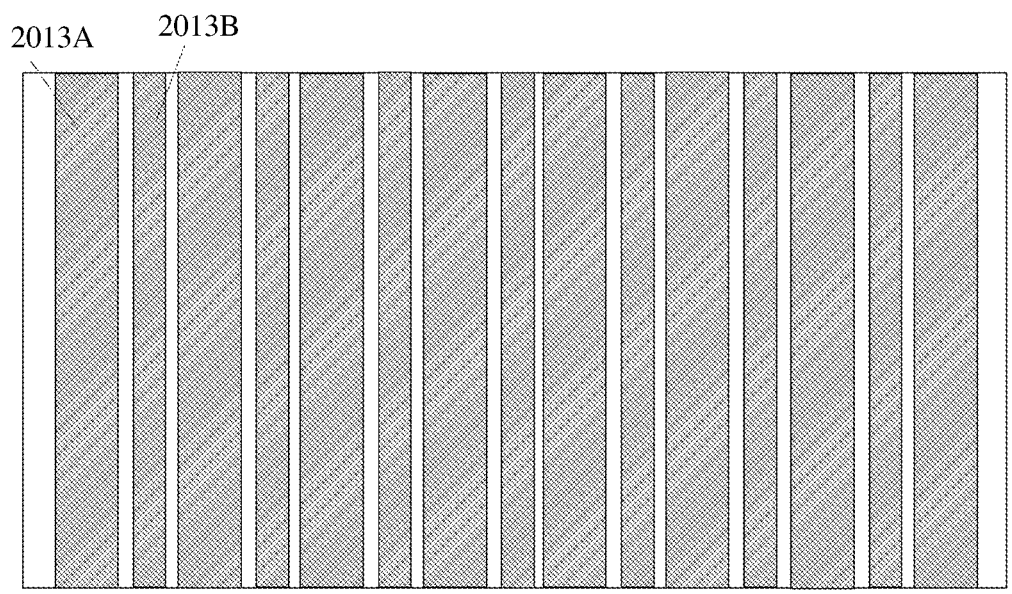
FIG. 11A is a planar schematic diagram of a second control electrode layer of a piezoelectric layer in a touch panel provided by at least one embodiment of the present disclosure.
Figure 11B:
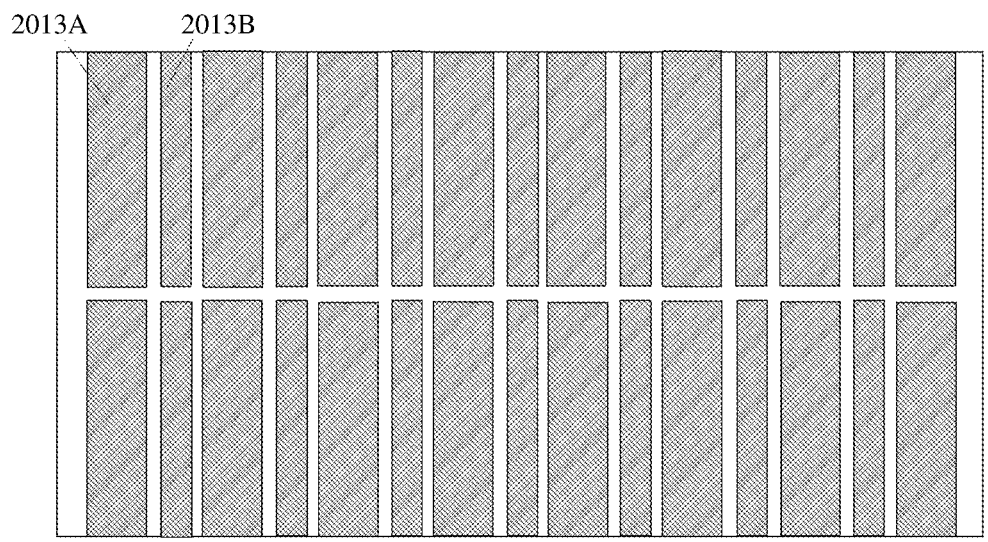
FIG. 11B is another planar schematic diagram of a second control electrode layer of a piezoelectric layer in a touch panel provided by at least one embodiment of the present disclosure.

Or, in some other embodiments, referring to FIG. 11A and FIG. 11B, the second control electrode layer 2013 includes a plurality of second control electrodes 2013A, orthographic projections of the plurality of second control electrodes 2013A on the second substrate 20 are respectively at least partially overlapped with the orthographic projections of the plurality of first pressure sensing electrodes 2011B and the plurality of first vibration feedback electrodes 2011A on the second substrate 20. For example, the pattern and the size of each of the plurality of second control electrodes 2013A are substantially the same as the pattern and the size of each of the plurality of first pressure sensing electrodes 2011B and each of the plurality of first vibration feedback electrodes 2011A respectively, or the patterns of each of the plurality of second control electrodes 2013A are substantially the same as the patterns of each of the plurality of first pressure sensing electrodes 2011B and each of the plurality of first vibration feedback electrodes 2011A respectively, the dimensions are respectively slightly larger than the dimensions of the plurality of first pressure sensing electrodes 2011B and the plurality of first vibration feedback electrodes 2011A, so that the second control electrodes 2013A can be better overlapped with the plurality of first pressure sensing electrodes 2011B and the plurality of first vibration feedback electrodes 2011A.

Figure 12A:
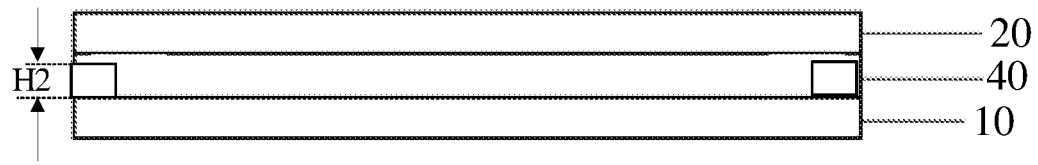
FIG. 12A is another cross-sectional schematic diagram of a touch panel provided by at least one embodiment of the present disclosure.

For example, FIG. 12A shows another cross-sectional schematic diagram of a touch panel. As shown in FIG. 12A, in some embodiments, in order to further improve the pressure sensing performance of the touch panel and avoid signal misjudgment in a case that the piezoelectric layer 201 is simultaneously used as a pressure detection layer and a tactile vibration feedback layer, or to extend the response time, the touch panel may also include at least one pressure sensor sensitive element 40 arranged between the second substrate 20 and the control substrate, the pressure sensor sensitive element 40 is electrically connected with the control circuit 110. The pressure sensor sensitive element 40 may also sense the pressure pressed on the surface of the touch panel, and transmit a signal to the control circuit 110.

For example, the pressure sensor sensitive element 40 may be a ceramic capacitive pressure sensor sensitive element or other pressure-sensitive elements, for realizing pressure detection. For example, the ceramic capacitive pressure sensor sensitive element uses ceramics as the sensitive element, to form a capacitive structure and dry measurement without intermediary liquid, and senses change of pressure through change of capacitance value. Compared with common silicon piezoresistive sensor products, the ceramic capacitive pressure sensor sensitive element may be applied to various measurement medium environments, and can maintain high measurement accuracy in a wide temperature range (such as −40° C. to 150° C.).

For example, the pressure sensor sensitive element 40 may be a commercially available device, and be bonded on the touch substrate with an optically clear adhesive (OCA), for example, bonded on the control circuit layer 11 or the first substrate 10, and are electrically connected with the control circuit. When the touch panel is subjected to pressure and the pressure reaches a threshold, the pressure sensor sensitive element 40 is triggered to generate a voltage change and transmit an electrical signal to the control circuit.

For example, in some embodiments, the pressure sensor sensitive element 40 and the spacers 30 are arranged on the same plane, such as on the control circuit layer 11 or on the first substrate 10, as shown in FIG. 12A, in a direction perpendicular to the second substrate 20, a height H2 of the pressure sensor sensitive element 40 is lower than a height H1 of each of the spacers 30. In a case that the touch panel is under pressure and the pressure reaches a threshold, the second substrate 20 will directly contact the pressure sensor sensitive element 40 and trigger the pressure sensor sensitive element 40.

Figure 12B:
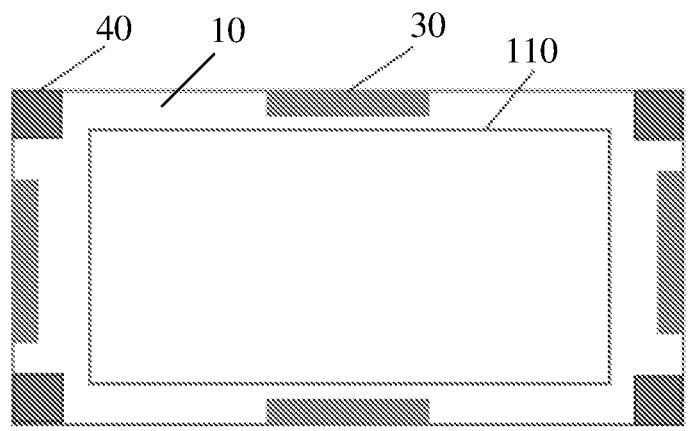
FIG. 12B is a schematic diagram of a planar arrangement of pressure sensor sensitive elements in a touch panel provided by at least one embodiment of the present disclosure.
Figure 12C:
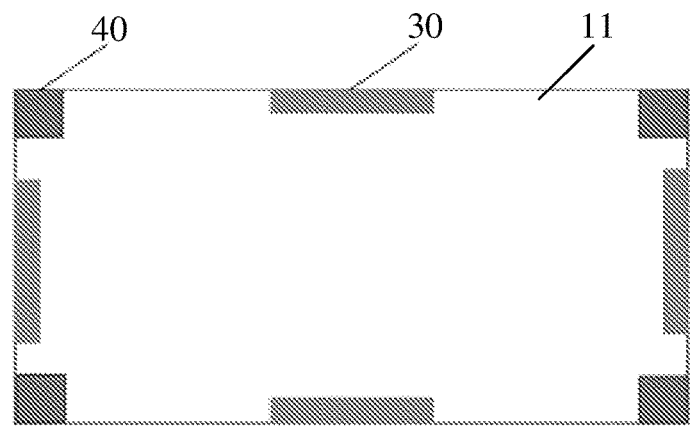
FIG. 12C is another schematic diagram of a planar arrangement of pressure sensor sensitive elements in a touch panel provided by at least one embodiment of the present disclosure.

For example, FIG. 12B and FIG. 12C show planar schematic diagrams of the pressure sensor sensitive elements 40. In some embodiments, the at least one pressure sensor sensitive element 40 includes a plurality of pressure sensor sensitive elements 40, both the pressure sensor sensitive elements 40 and the spacers 30 are arranged on the control substrate, for example, arranged on the first substrate 10 (a situation shown in FIG. 12B) or on the control circuit layer 11 (a situation shown in FIG. 12C), and are arranged on an edge of the first substrate 10 or the control circuit layer 11.

For example, in the embodiment shown in FIG. 12B, the control circuit layer 11 is arranged in the middle of the first substrate 10, thus the pressure sensor sensitive elements 40 may be directly arranged between the second substrate 20 and the first substrate 10, for example, arranged on edges of the four sides of the first substrate 10; in the embodiment shown in FIG. 12C, an arrangement range of the control circuit layer 11 on the first substrate 10 is basically the same, thus the pressure sensor sensitive elements 40 are directly arranged between the control circuit layer 11 and the first substrate 10, for example, arranged on the edges of the four sides of the control circuit layer 11.

The embodiments of FIG. 12B and FIG. 12C are illustrated by taking the pressure sensor sensitive elements 40 arranged on the edge of the four sides of the first substrate 10 or the four sides of the control circuit layer 11 as an example, in other embodiments, the pressure sensor sensitive elements 40 may also be arranged at the four corners of the first substrate 10 or the control circuit layer 11, at this time, the spacers 30 are arranged on four sides of the first substrate 10 or the control circuit layer 11.

In the embodiment of the present disclosure, since the height H2 of the pressure sensor sensitive element 40 is lower than the height H2 of each of the spacers 30, the pressure sensor sensitive element 40 is spaced apart from the second substrate 20, as shown in FIG. 12A, in a case that the touch panel is not subjected to an external force, the pressure sensor sensitive element 40 will not be triggered, and in a case that the touch panel is subjected to an external force, the second substrate 20 is deformed to touch the pressure sensor sensitive element 40, thus the pressure sensor sensitive element 40 will sense the pressure, realize the piezoelectric conversion, and transmit the electric signal to the touch circuit 110.

Figure 13A:
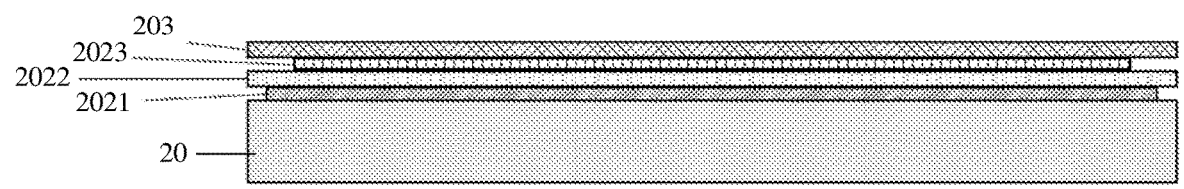
FIG. 13A is a cross-sectional schematic diagram of a touch layer in a touch panel provided by at least one embodiment of the present disclosure.
Figure 13B:
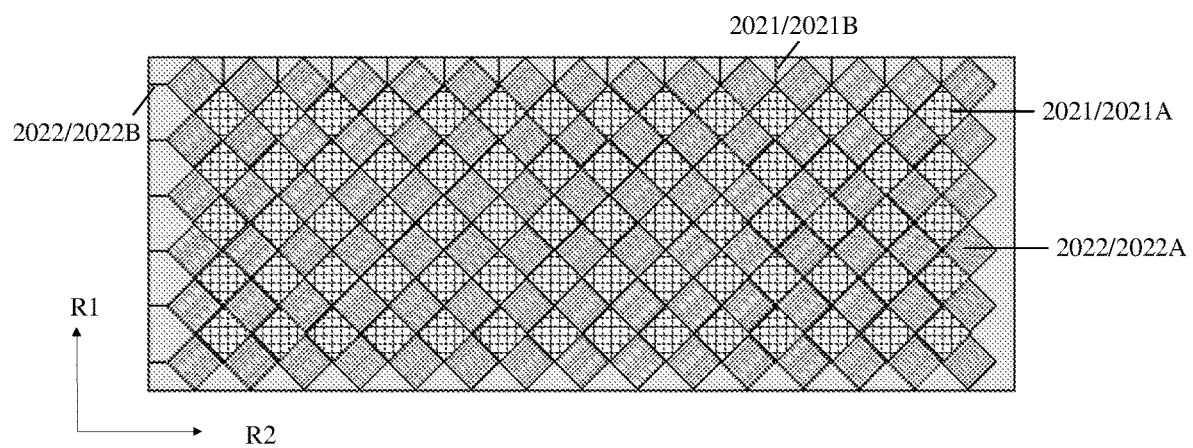
FIG. 13B is a planar schematic diagram of a touch layer in a touch panel provided by at least one embodiment of the present disclosure.

For example, FIG. 13A shows a cross-sectional schematic diagram of the touch layer, and FIG. 13B shows a planar schematic diagram of the touch layer. As shown in FIG. 13A, the touch layer 201 includes a first touch electrode layer 2021, a second touch electrode layer 2023 and an interval insulating layer 2022 between the first touch electrode layer 2021 and the second touch electrode layer 2023.

As shown in FIG. 13B, the first touch electrode layer 2021 includes a plurality of first touch electrodes 2021A extending along the first direction R1, for example including a plurality of electrode blocks arranged along the first direction R1 and electrically connected with each other, the first touch electrodes 2021A is electrically connected with the control circuit 110 through the first touch line 2021B; the second touch electrode layer 2022 includes a plurality of second touch electrodes 2022A extending along a second direction R2 intersecting with the first direction R1, for example including a plurality of electrode blocks arranged along the second direction R2 and electrically connected with each other, and the second touch electrodes 2022A are electrically connected with the control circuit 110 through the second touch line 2022B.

For example, the first touch electrode layer 2021 and the second touch electrode layer 2023 are made of transparent metal oxide materials such as indium tin oxide (ITO), the interval insulating layer 2022 may use optical clear adhesive (OCA), so that the interval insulating layer 2022 can simultaneously play the roles of spacer, insulation and adhesion.

For example, during the manufacturing process, the first touch electrode layer 2021 and the second touch electrode layer 2023 may be directly deposited on the second substrate 20 by magnetron sputtering or sol-gel or aerosol method, in a case that the piezoelectric material layer 2012 is formed after the first touch electrode layer 2021 and the second touch electrode layer 2023 are formed, since heat treatment temperature of the piezoelectric material layer 2012 is generally greater than 500 degrees, at this time, the interval insulating layer 2022 may also use inorganic insulating materials such as silicon oxide, silicon nitride or silicon oxynitride, to avoid being melted.

Through the above structure, the touch layer may be implemented as a projected capacitive touch layer, the touch electrodes intersecting in the first direction R1 and the second direction R2 form a capacitance matrix, and by detecting the change of the capacitances of the touch positions, the coordinates of the touch positions are calculated.

For example, in a case that an object such as a finger touches the touch panel, the object such as the finger will form capacitor with the first touch electrodes 2021A and the second touch electrodes 2022B, so that the original capacitive structure of the first touch electrodes 2021A and the second touch electrodes 2022B will be changed, by detecting abscissa and ordinate of the first touch electrodes 2021A and the second touch electrodes 2022B whose capacitance have been changed respectively, the touch position of the object such as the finger can be determined, so that touch detection is realized.

For example, the second substrate 20 may be a rigid substrate, such as a non-metallic substrate such as a glass, a quartz substrate or a plastic substrate, or a metal substrate such as an aluminum substrate and an aluminum alloy substrate; or the second substrate 20 may also be a flexible substrate, such as an insulating substrate formed of an organic insulating material such as polyimide. For example, the touch layer 202 and the piezoelectric layer 201 may be manufactured on the second substrate 20 respectively, and are attached to the touch substrate as a whole with the second substrate 20.

For example, the first substrate 10 may be a rigid substrate, such as a non-metallic substrate such as a glass, a quartz substrate or a plastic substrate, or a metal substrate such as an aluminum substrate and an aluminum alloy substrate, to provide better support and protection.

For example, in some embodiments, the first control electrode layer, the piezoelectric material layer and the second control electrode layer may adopt different patterns and connection manners. For example, FIG. 14A to FIG. 14E are planar schematic diagrams of various layers of a piezoelectric layer in a touch panel provided by an embodiment of the present disclosure.

Figure 14A:
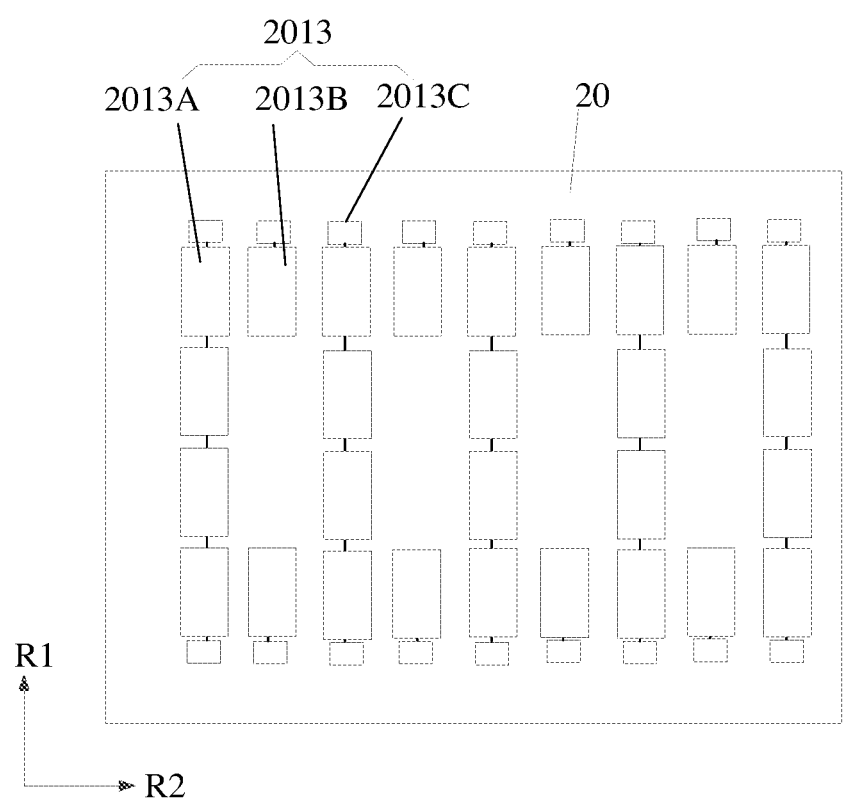
FIG. 14A to FIG. 14E are planar schematic diagrams of each layer of a piezoelectric layer in a touch panel provided by at least one embodiment of the present disclosure.

For example, FIG. 14A shows a planar schematic diagram of the second control electrode layer 2013, in this example, the second control electrode layer 2013 is arranged on the second substrate 20, and the second control electrode layer 2013 includes a plurality of second control electrode patterns 2013A, 2013B, and 2013C. For example, the second control electrode patterns 2013A are used to overlapped with the first vibration feedback electrodes 2011A, to realize the vibration feedback function, the second control electrode patterns 2013B are used to overlapped with the first pressure sensing electrodes 2011B, and are used to realize the pressure detection function, the second control electrode patterns 2013C are served as a contact pad for electrical connection with the control circuit.

For example, as shown in FIG. 14A, the number of second control electrode patterns 2013B is smaller than the number of second control electrode patterns 2013A. For example, the plurality of second control electrode patterns 2013A located in the same column are electrically connected with each other and are connected with the second control electrode patterns 2013C; the number of the second control electrode patterns 2013B located in a same column is two, and the second control electrode patterns 2013B are located at the head and the end of the column.

For example, in this embodiment, the patterns and the sizes of the second control electrode patterns 2013A are substantially the same as the patterns and sizes of the second control electrode patterns 2013B.

Figure 14B:
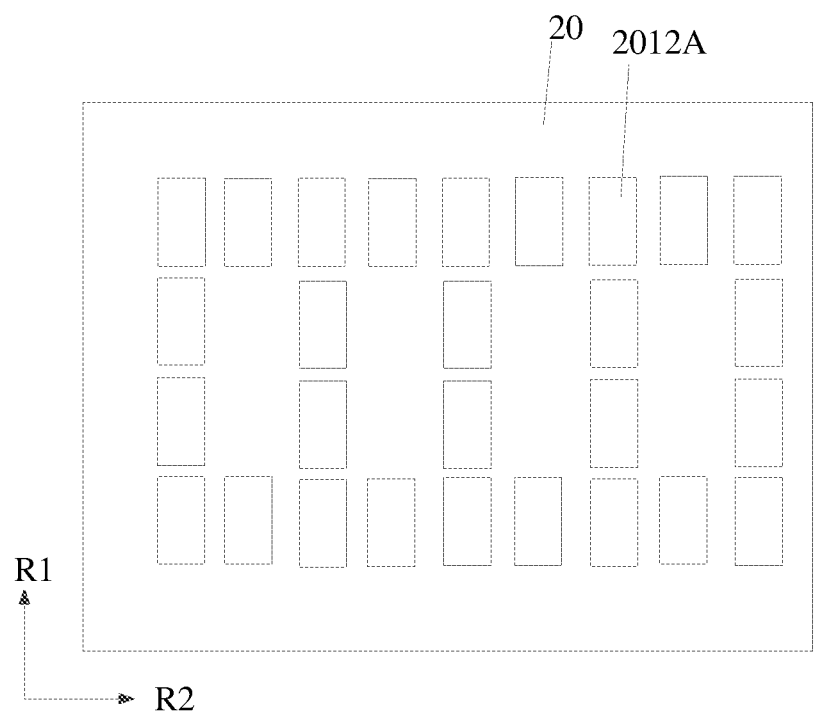

For example, FIG. 14B shows a planar schematic diagram of a piezoelectric material layer 2012, as shown in FIG. 14B, the piezoelectric material layer 2012 includes a plurality of piezoelectric material patterns 2012A, and the plurality of piezoelectric material patterns 2012A are in one-to-one correspondence with and overlapped with the second control electrode pattern 2013A and the second control electrode pattern 2013B respectively.

Figure 14C:
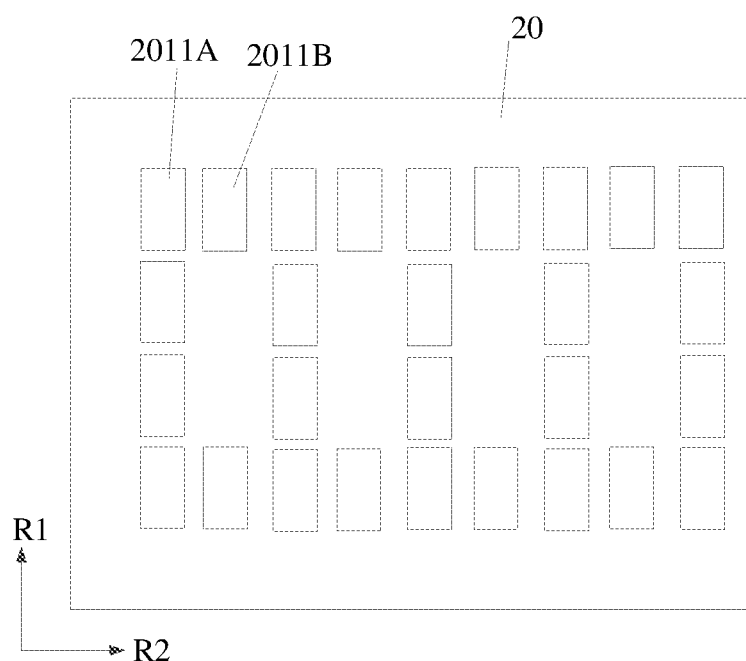

For example, FIG. 14C shows a planar schematic diagram of the first control electrode layer 2011, as shown in FIG. 14C, the first control electrode layer 2011 includes a plurality of first pressure sensing electrodes 2011B and a plurality of first vibration feedback electrodes 2011A, the plurality of first pressure sensing electrodes 2011B and the plurality of first vibration feedback electrodes 2011A are overlapped with the plurality of piezoelectric material patterns 2012A in a one-to-one correspondence. A plurality of first pressure sensing electrodes 2011B together with a plurality of piezoelectric material patterns 2012A and a plurality of second control electrode patterns 2013B constitute a pressure sensing unit, and a plurality of first vibration feedback electrodes 2011A together with a plurality of piezoelectric material patterns 2012A and a plurality of second control electrode patterns 2013A constitute a vibration feedback unit.

Figure 14D:
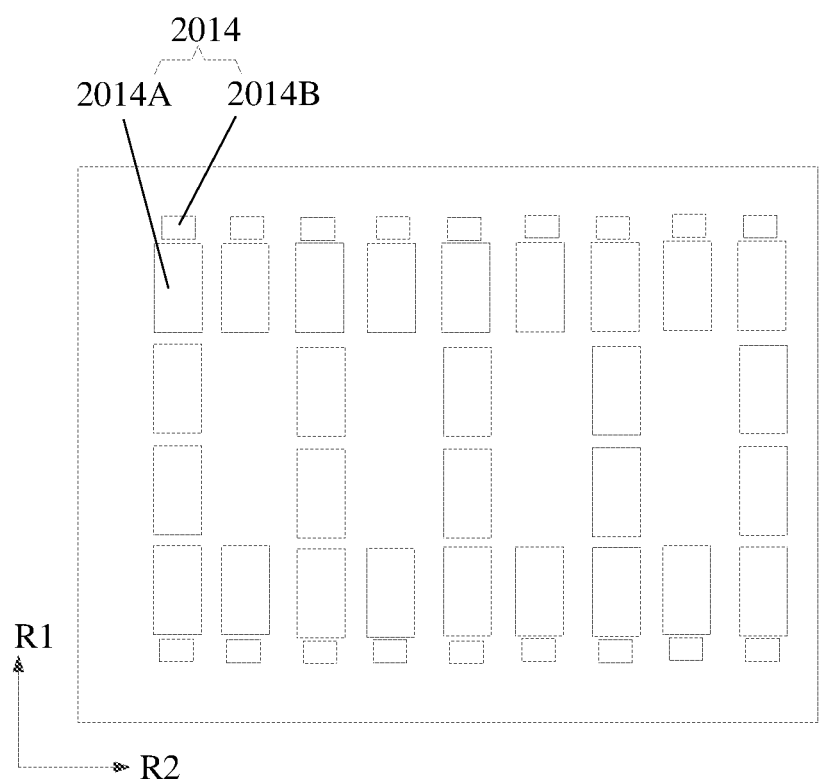

For example, FIG. 14D shows a planar schematic diagram of a first insulating layer 2014, as shown in FIG. 14D, the first insulating layer 2014 is arranged on the first control electrode layer 2011, and the first insulating layer 2014 includes a plurality of openings 2012B exposing the second control electrode patterns 2013C and a plurality of openings 2014A exposing the plurality of first vibration feedback electrodes 2011A and the plurality of first pressure sensing electrodes 2011B, and these openings are used for electrical connection of the wirings and the exposed structures.

Figure 14E:
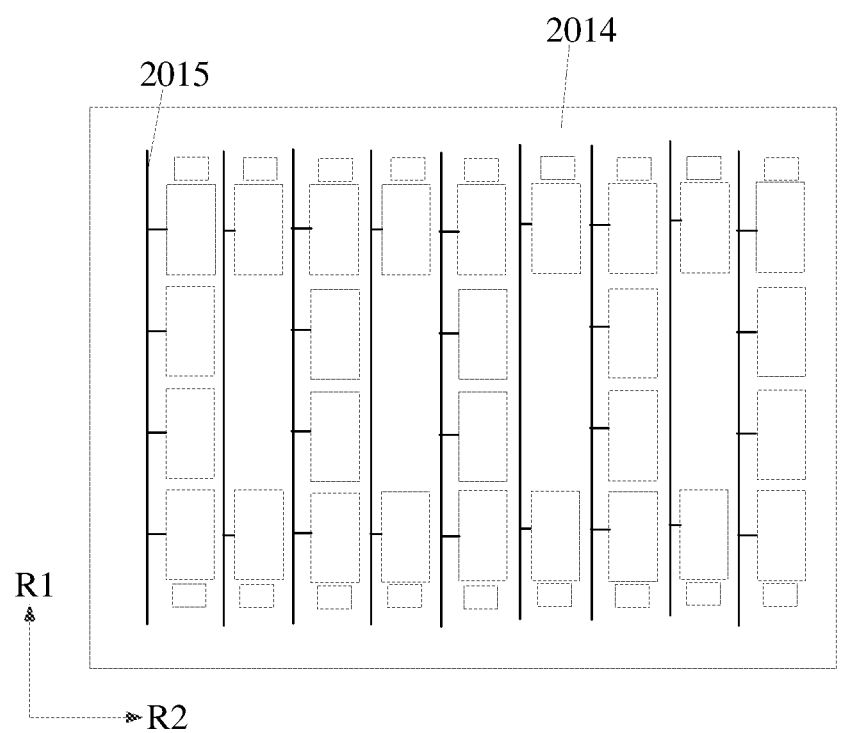

For example, FIG. 14E shows a planar schematic diagram of a wiring layer, as shown in FIG. 14E, the wiring layer includes a plurality of wirings 2015, each of the wirings 2015 is used to electrically connect first pressure sensing electrodes 2011B located in a same column or first vibration feedback electrodes 2011A located in a same column, and is connected with the control circuit; or in other embodiments, each of the wirings 2015 may also be connected with one first vibration feedback electrode 2011A or one first pressure sensing electrode 2011B. Embodiments of the present disclosure do not limit the electrical connection manners of the plurality of wirings 2015 and the plurality of first vibration feedback electrodes 2011A and the plurality of first pressure sensing electrodes 2011B.

For example, FIG. 15A to FIG. 15E are planar schematic diagram of various layers of a piezoelectric layer in another touch panel provided by another embodiment of the present disclosure.

Figure 15A:
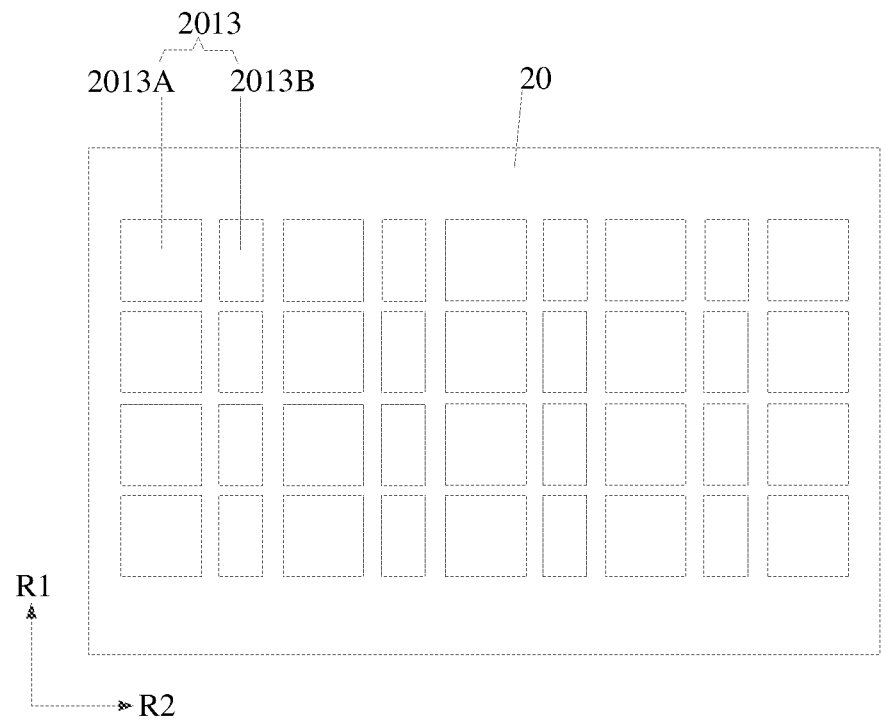
FIG. 15A to FIG. 15D are planar schematic diagrams of each layer of a piezoelectric layer in another touch panel provided by at least one embodiment of the present disclosure.

For example, FIG. 15A shows a planar schematic diagram of a second control electrode layer 2013, in this example, the second control electrode layer 2013 is arranged on the second substrate 20, the second control electrode layer 2013 includes a plurality of second control electrode patterns 2013A and 2013B, for example, the second control electrode patterns 2013A are used to be overlapped with the first vibration feedback electrodes 2011A, to realize the vibration feedback function, and the second control electrode patterns 2013B are used to be overlapped with the first pressure sensing electrodes 2011B, and are used to realize the pressure detection function.

For example, as shown in FIG. 15A, the number of the second control electrode patterns 2013B is equal to the number of the second control electrode patterns 2013A. The widths (areas) of the second control electrode patterns 2013A are larger than the widths (areas) of the second control electrode patterns 2013B.

Figure 15B:
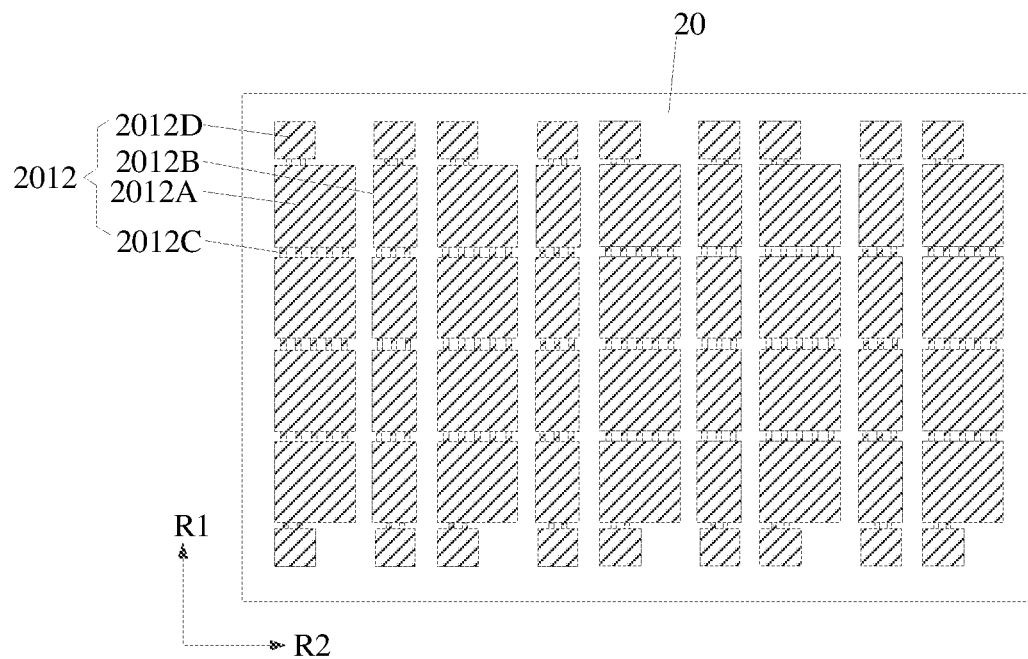

For example, FIG. 15B shows a planar schematic diagram of a piezoelectric material layer 2012, as shown in FIG. 15B, the piezoelectric material layer 2012 includes a plurality of piezoelectric material patterns 2012A, 2012B, 2012C, and 2012D, the plurality of piezoelectric material patterns 2012A are respectively overlapped with the plurality of second control electrode patterns 2013A, and the plurality of piezoelectric material patterns 2012A are overlapped with the plurality of second control electrode patterns 2013B, respectively. The piezoelectric material patterns 2012D are used to be overlapped with the contact pad 2011D (described later) in the first control electrode layer 2011, the piezoelectric material patterns 2012C are used as connection structures for connecting two adjacent piezoelectric material patterns 2012A or two adjacent piezoelectric material patterns 2012B in the column direction, or connecting the piezoelectric material patterns 2012A or 2012B with the piezoelectric material patterns 2012D.

Figure 15C:
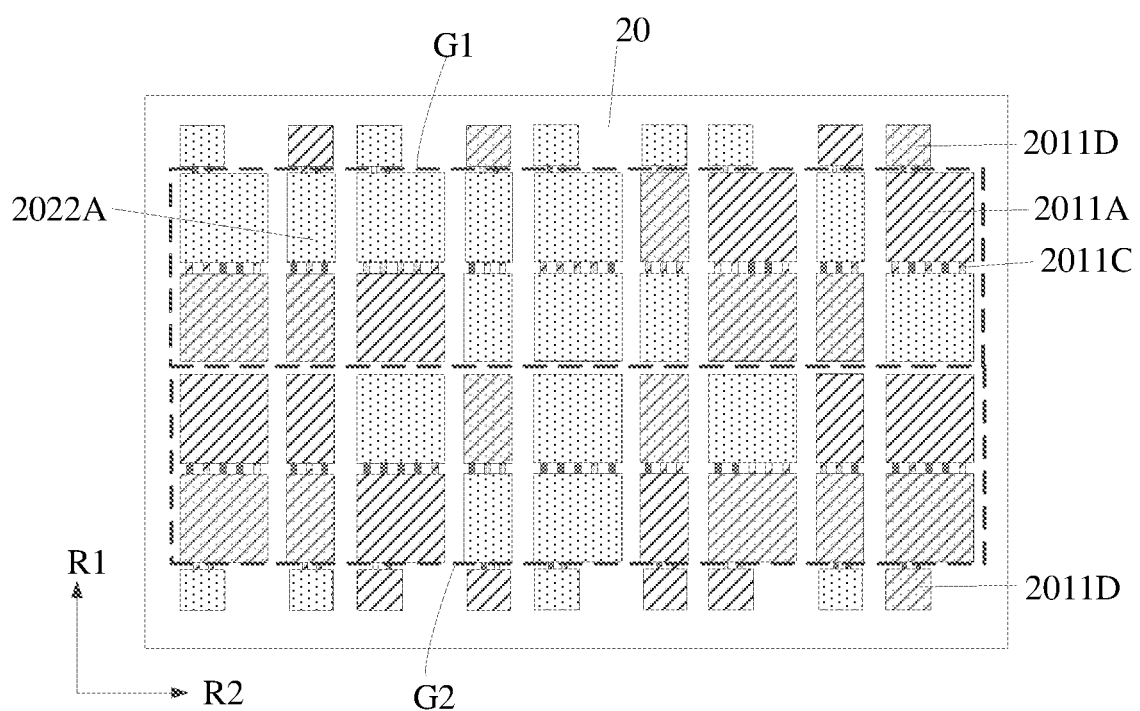

For example, FIG. 15C shows a planar schematic diagram of a first control electrode layer 2011, as shown in FIG. 15C, the first control electrode layer 2011 includes a plurality of first pressure sensing electrodes 2011B, a plurality of first vibration feedback electrodes 2011A, a connection electrode 2011C and a contact pad 2011D. The plurality of first pressure sensing electrodes 2011B and the plurality of first vibration feedback electrodes 2011A are overlapped with the plurality of piezoelectric material patterns 2012A and 2012B, respectively. The plurality of first pressure sensing electrodes 2011B together with the plurality of piezoelectric material patterns 2012B and the plurality of second control electrode patterns 2013B constitute a pressure sensing unit, and the plurality of first vibration feedback electrodes 2011A together with the plurality of piezoelectric material patterns 2012A and the plurality of second control electrode patterns 2013A constitute a vibration feedback unit.

In FIG. 15C, the plurality of first pressure sensing electrodes 2011B and the plurality of first vibration feedback electrodes 2011A are divided into two regions, that is, an upper half region G1 and a lower half region G2 in the figure, the first pressure sensing electrodes 2011B located in a same region and in a same column are electrically connected by the connection electrodes 2011C, and are connected with the corresponding contact pad 2011D; the first vibration feedback electrodes 2011A located in the same region and in the same column are electrically connected by the connection electrodes 2011C, and are connect with the corresponding contact pad 2011D.

Figure 15D:
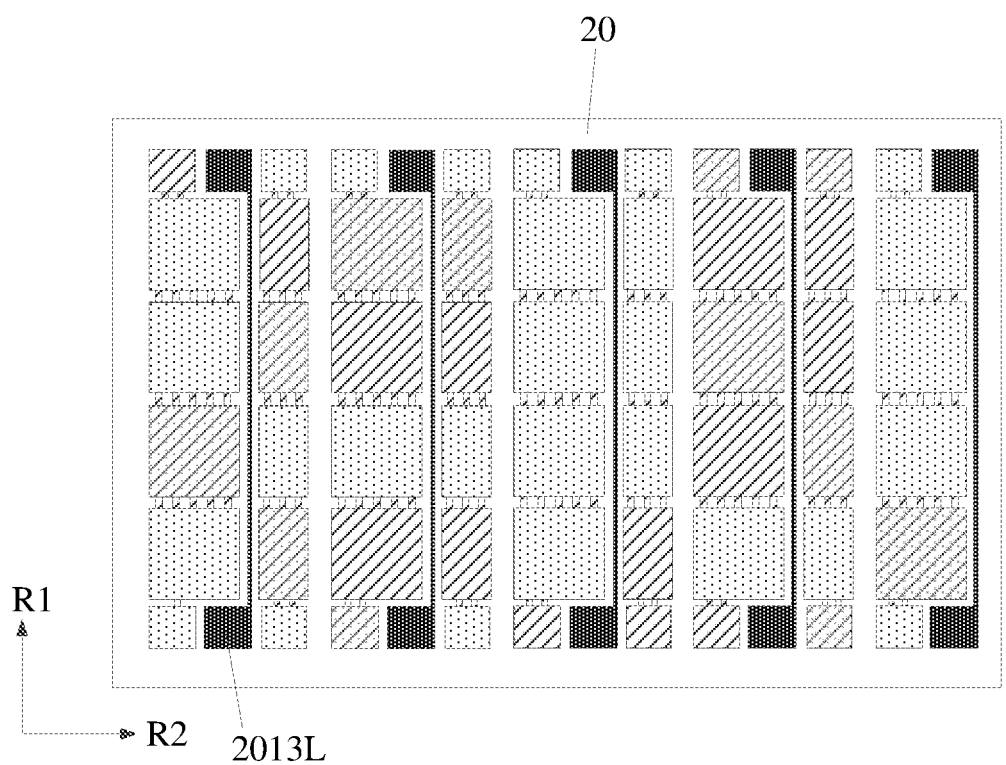

For example, FIG. 15D shows a planar schematic diagram of a first wiring layer, as shown in FIG. 15D, the first wiring layer is arranged on the second substrate 20, including the wirings 2013L electrically connected with the plurality of second control electrode patterns 2013A and 2013B, and the ends of the wirings 2013L are used for electrical connection with the control circuit. For example, in some embodiments, in a case that the second control layer 2013 is arranged on the entire surface, the wirings 2013L may be directly arranged on the second control layer 2013.

Figure 16:
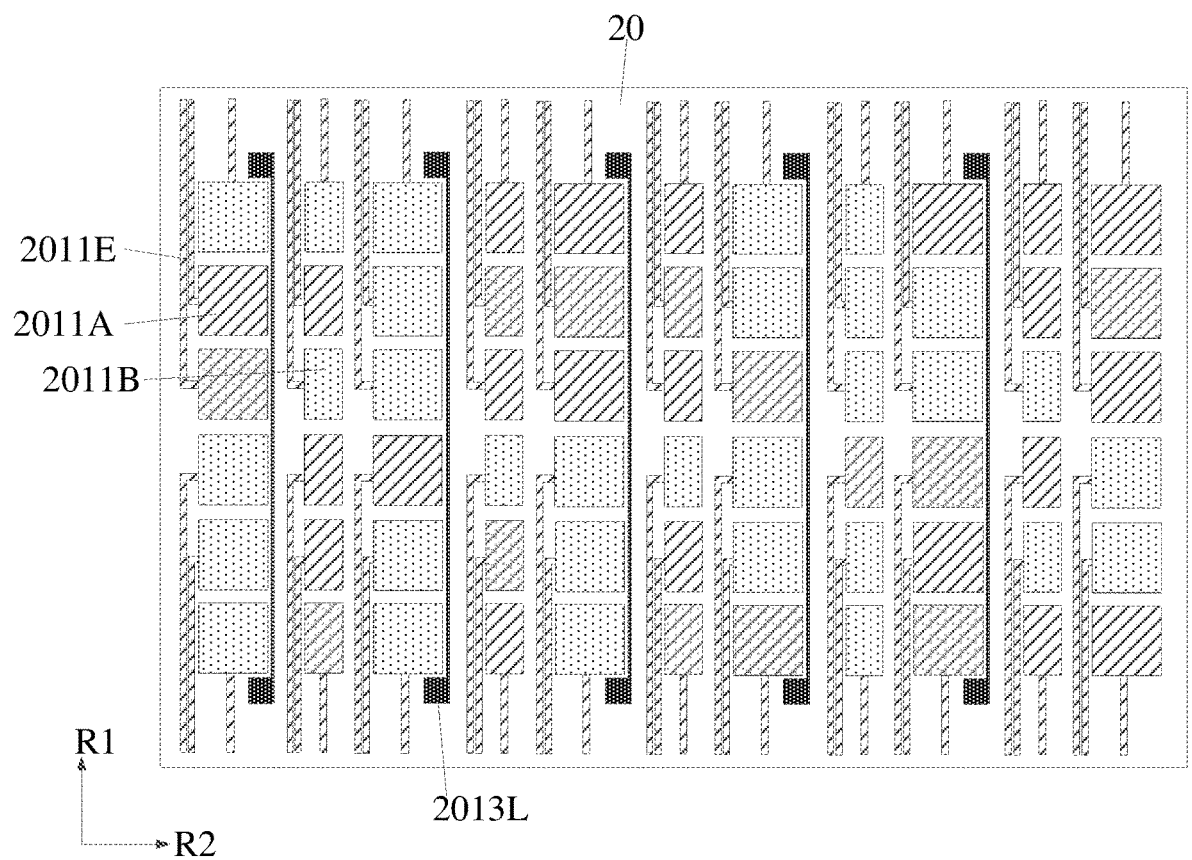
FIG. 16 is a planar schematic diagram of a first control electrode layer, a second control electrode layer and a wiring layer in a touch panel provided by at least one embodiment of the present disclosure.

For example, FIG. 16 shows a planar schematic diagram of a first control electrode layer, a second control electrode layer and a wiring layer in other embodiments, as shown in FIG. 16, in this embodiment, the first wiring layer includes a plurality of wirings 2013L, the plurality of wirings 2013L are respectively used to electrically connect the second touch electrode patterns 2013A and 2013B with the control circuit. The second wiring layer includes a plurality of wirings 2011E, and the plurality of wirings 2011E are respectively electrically connected with one first vibration feedback electrode 2011A to the control circuit, or electrically connect one first pressure sensing electrode 2011B to the control circuit, so that separate control of each of the vibration feedback units and each of the pressure sensing units is realized.

In other embodiments of the present disclosure, the first control electrode layer and the second control electrode layer may also be electrically connected with the control circuit in other ways, and the piezoelectric material layer may also be arranged in other ways, which will not be repeated herein.

The following statements should be noted:
(1) The accompanying drawings of the embodiments of the present disclosure involve only the structure(s) in connection with the embodiment(s) of the present disclosure, and other structure(s) may be referred to common design(s).
(2) For the purpose of clarity only, in accompanying drawings for illustrating the embodiment(s) of the present disclosure, the thickness and size of a layer or a structure may be enlarged, that is, the accompanying drawings are not drawn according to the actual scale. However, it should understood that, in the case in which a component or element such as a layer, film, region, substrate or the like is referred to be "on" or "under" another component or element, it may be directly on or under the another component or element or a component or element is interposed therebetween.
(3) In case of no conflict, features in one embodiment or in different embodiments can be combined to obtain a new embodiment.

In case of no conflict, embodiments of the present disclosure or features in one embodiment or in different embodiments may be combined.

What are described above is related to the specific embodiments of the disclosure only and not limitative to the scope of the disclosure. The protection scope of the disclosure shall be based on the protection scope of the claims.

What is claimed is:

1. A touch panel, comprising a control substrate, a touch layer and a piezoelectric layer that are stacked,
   wherein the control substrate comprises a first substrate and a control circuit layer arranged on the first substrate, and the touch layer and the piezoelectric layer are located on the control substrate,
   the control circuit layer comprises a control circuit, and the control circuit is electrically connected with the touch layer and the piezoelectric layer respectively, and is configured to apply electrical signals to the touch layer and the piezoelectric layer and/or receive electrical signals from the touch layer and the piezoelectric layer respectively,
   wherein the touch panel further comprises a second substrate, wherein the touch layer and the piezoelectric layer are arranged on the second substrate, and
   the second substrate, the touch layer and the piezoelectric layer are arranged as a whole on a side of the control circuit layer away from the first substrate,
   wherein the touch layer and the piezoelectric layer are respectively arranged on a same side of the second substrate, and
   the touch panel further comprises an electromagnetic shielding layer arranged between the touch layer and the piezoelectric layer,
   wherein the touch layer is arranged on a side of the piezoelectric layer away from the control substrate,
   the touch panel further comprises a cover plate on a surface of the touch layer away from the control substrate, and a surface of the cover plate away from the control substrate becomes a touch surface of the touch panel,
   wherein the electromagnetic shielding layer is grounded or be applied with a fixed low-level voltage, and the touch panel further includes an interval insulating layer arranged between the electromagnetic shielding layer and the piezoelectric layer.

2. The touch panel according to claim 1, further comprising at least one spacer arranged between the second substrate and the control substrate, to space the second substrate and the control substrate.

3. The touch panel according to claim 2, wherein the at least one spacer comprises a plurality of spacers, and the plurality of spacers are arranged at intervals on edges of the second substrate and the control substrate,
   wherein a planar shape of the second substrate and a plane shape of the control substrate are rectangles, and
   each of the plurality of spacers is shaped in a straight line and the plurality of spacers are disposed along at least two sides of the rectangle respectively.

4. The touch panel according to claim 3, wherein the plurality of spacers comprise four spacers, each of the four spacers has a shape of a straight line, and the four spacers are disposed at middle positions of four sides of the rectangle respectively.

5. The touch panel according to claim 3, wherein the plurality of spacers comprise four spacers, and the rectangle comprises two opposite long sides and two opposite short sides, and each of the four spacers has a shape of a straight line, and the four spacers are arranged along the two long sides of the rectangle, and two spacers are correspondingly arranged on each of the two long sides.

6. The touch panel according to claim 5, wherein a length of each of the long sides is L, and each of the long sides has a first end point and a second end point, and
   a distance between the first end point and a central axis of one of the two spacers close to the first end point perpendicular to each of the long sides is from ¼L to ⅓L, and a distance between the second end point and a central axis of one of the two spacers close to the second end point perpendicular to each of the long sides is from ¼L to ⅓L,
   wherein a length of the long side of the rectangle is L, and a length of the short side is W,
   a length of each spacer in the plurality of spacers is from 0.1 L to 0.5 L, and a width of each spacer in the plurality of spacers is from 0.01 W to 0.10 W.

7. The touch panel according to claim 3, wherein planar shapes of the second substrate and the control substrate are rectangles, and
   the plurality of spacers comprise four spacers, and each of the four spacers is shaped in an L shape and are disposed along four corners of the rectangle.

8. The touch panel according to claim 2, wherein in a direction perpendicular to the second substrate, a height of the at least one spacer is from 0.5 mm to 10 mm,
   wherein Young's modulus of material of the at least one spacer is from 0.1 MPa to 2.0 MPa.

9. The touch panel according to claim 2, further comprising at least one pressure sensor sensitive element arranged between the second substrate and the control substrate, wherein the at least one pressure sensor sensitive element is electrically connected with the control circuit, and
   in a direction perpendicular to the second substrate, a height of the at least one pressure sensor sensitive element is lower than a height of the at least one spacer,
   wherein the at least one pressure sensor sensitive element and the at least one spacer are both arranged on the control substrate, and
   the at least one pressure sensor sensitive element is separated from the second substrate.

10. The touch panel according to claim 1, wherein the piezoelectric layer comprises a first control electrode layer, a second control electrode layer, and a piezoelectric material layer between the first control electrode layer and the second control electrode layer,
    wherein the first control electrode layer comprises a plurality of first pressure sensing electrodes arranged at intervals, at least one of the plurality of first pressure sensing electrodes is configured to transmit a pressure sensing signal to the control circuit in a case that the piezoelectric material layer is under pressure,
    wherein the first control electrode layer further comprises a plurality of first vibration feedback electrodes arranged at intervals,
    the control circuit is configured to apply an electrical signal to at least one of the plurality of first vibratory feedback electrodes in a case that the pressure sensing signal is greater than a threshold, to drive the piezoelectric material layer to vibrate.

11. The touch panel according to claim 10, wherein the plurality of first pressure sensing electrodes and the plurality of first vibration feedback electrodes are strip-shaped electrodes, and the strip-shaped electrodes extend along a first direction and are arranged at intervals in a second direction which is perpendicular to the first direction,
    wherein a width of each of the plurality of first vibration feedback electrodes in the second direction is greater than a width of each of the plurality of first pressure sensing electrodes in the second direction.

12. The touch panel according to claim 11, wherein the plurality of first pressure sensing electrodes and the plurality of first vibration feedback electrodes are arranged alternately in the second direction.

13. The touch panel according to claim 11, wherein each of the plurality of first pressure sensing electrodes comprises a plurality of sub-strip electrodes spaced along the first direction; and
    each of the plurality of first vibration feedback electrodes comprises a plurality of sub-strip electrodes spaced along the first direction.

14. The touch panel according to claim 10, wherein the plurality of first pressure sensing electrodes and the plurality of first vibration feedback electrodes are block-shaped electrodes,
    the plurality of first pressure sensing electrodes are spaced along the first direction and are arranged in a column, the plurality of first vibration feedback electrodes are spaced along the first direction and are arranged in a column, and
    a plurality of columns of first pressure sensing electrodes and a plurality of columns of first vibration feedback electrodes are arranged alternately along a second direction perpendicular to the first direction.

15. The touch panel according to claim 10, wherein the piezoelectric material layer is arranged on an entire surface, wherein the piezoelectric material layer comprises a plurality of piezoelectric material patterns, the plurality of piezoelectric material patterns extend along the first direction, and are arranged at intervals in the second direction,
    orthographic projections of the plurality of piezoelectric material patterns on the second substrate are at least partially overlapped with orthographic projections of the plurality of first pressure sensing electrodes and the plurality of first vibration feedback electrodes on the second substrate.

16. The touch panel according to claim 10, wherein the second control electrode layer is a surface electrode layer; or
    the second control electrode layer comprises a plurality of second control electrodes, orthographic projections of the plurality of second control electrodes on the second substrate are at least partially overlapped with orthographic projections of the plurality of first pressure sensing electrodes and orthographic projections of the plurality of first vibration feedback electrodes respectively on the second substrate.

17. The touch panel according to claim 1, wherein the touch layer comprises a first touch electrode layer, a second touch electrode layer, and an interval insulating layer between the first touch electrode layer and the second touch electrode layer,
    the first touch electrode layer comprises a plurality of first touch electrodes extending along a first direction, and
    the second touch electrode layer comprises a plurality of second touch electrodes extending along a second direction intersecting the first direction.

* * * * *